(12) United States Patent
Billard et al.

(10) Patent No.: US 12,435,378 B2
(45) Date of Patent: Oct. 7, 2025

(54) PKS-ISLAND POSITIVE E. coli AS MARKER OF NEGATIVE RESPONSE TO ANTI-PD1 THERAPY IN COLORECTAL CANCER

(71) Applicants: SANOFI, Paris (FR); UNIVERSITÉ CLERMONT AUVERGNE, Clermont Ferrand (FR)

(72) Inventors: Elisabeth Billard, Clermont Ferrand (FR); Mathilde Bonnet, Vic le Comte (FR); Bruno Dumas, Paris (FR); Amélie Lopes, Paris (FR)

(73) Assignees: SANIFI, Paris (FR); UNIVERSITÉ CLERMONT AUVERGNE

( * ) Notice: Subject to any disclaimer, the term of this patent is extended or adjusted under 35 U.S.C. 154(b) by 1154 days.

(21) Appl. No.: 17/299,428

(22) PCT Filed: Dec. 10, 2019

(86) PCT No.: PCT/EP2019/084487
§ 371 (c)(1),
(2) Date: Jun. 3, 2021

(87) PCT Pub. No.: WO2020/120501
PCT Pub. Date: Jun. 18, 2020

(65) Prior Publication Data
US 2022/0049314 A1 Feb. 17, 2022

(30) Foreign Application Priority Data
Dec. 11, 2018 (EP) .................................. 18306661

(51) Int. Cl.
*C12Q 1/6886* (2018.01)
*A61K 39/00* (2006.01)
*A61K 39/395* (2006.01)
*C07K 16/28* (2006.01)

(52) U.S. Cl.
CPC ...... *C12Q 1/6886* (2013.01); *A61K 39/39558* (2013.01); *A61K 2039/505* (2013.01); *A61K 2039/507* (2013.01); *C12Q 2600/106* (2013.01)

(58) Field of Classification Search
CPC .................. C12Q 1/6886; C12Q 2600/106
See application file for complete search history.

(56) References Cited

U.S. PATENT DOCUMENTS

2015/0203579 A1* 7/2015 Papadopoulos .......... A61P 7/04
600/1

FOREIGN PATENT DOCUMENTS

WO  WO 2015/001053 A1  1/2015
WO  WO 2018/115519 A1  6/2018

OTHER PUBLICATIONS

Johnson et al. Molecular Epidemiology and Phylogenetic Distribution of the *Escherichia coli* pks Genomic Island. Journal of Clinical Microbiology. 46(12): 3906-3911; Published: Oct. 22, 2008 (Year: 2008).*
Bronowski et al. A subset of mucosa-associated *Escherichia coli* isolates from patients with colon cancer, but not Crohn's disease, share pathogenicity islands with urinary pathogenic *E. coli*. Microbiology. 154: 571-583; Published: Feb. 1, 2008 (Year: 2008).*
Shimpoh et al. Prevalence of pks-positive *Escherichia coli* in Japanese patients with or without colorectal cancer. Gut Pathology. 9: 35; Published: Jun. 12, 2017 (Year: 2017).*
Sarshar et al. Genetic diversity, phylogroup distribution and virulence gene profile of pks positive *Escherichia coli* colonizing human intestinal polyps. Microbial Pathogenesis. 112: 274-278; Published: Oct. 13, 2017 (Year: 2017).*
Nowrouzian et al. *Escherichia coli* strains with the capacity for long-term persistence in the bowel microbiota carry the potentially genotoxic pks island. Microbial Pathogenesis. 53: 180-182; Published: Jun. 16, 2012 (Year: 2012).*
Hernandez-Luna et al. The Role of *Escherichia coli* in the Development and Progression of Cancer. ARC Journal of Cancer Science. 3(1): 1-11; Published: Feb. 2017 (Year: 2017).*
Putze et al. Genetic Structure and Distribution of the Colibactin Genomic Island among Members of the Family Enterobacteriaceae. Infection and Immunity. 77(11): 4696-4703; Published: Aug. 31, 2009 (Year: 2009).*
Lee et al. Options for Second-Line Treatment in Metastatic Colorectal Cancer. Clinical Advances in Hematology & Oncology. 14(1): 46-54; Published: Jan. 2016 (Year: 2016).*
Ciombor et al. Aflibercept—a Decoy VEGF Receptor. Current Oncology Reports. 16(2): 368; Published: Jan. 21, 2014 (Year: 2014).*
Clinical Trial Listing for NCT02375672 ClinicalTrials.gov; Version of Record: Jun. 25, 2018 (Year: 2018).*
Australian Public Assessment Report for Cemiplimab. Australian Department of Health; Dated: Nov. 2020 (Year: 2020).*
Gagniere et al. Interactions between microsatellite instability and human gut colonization by *Escherichia coli* in colorectal cancer. Clinical Research. 131: 471-485; Published: Mar. 6, 2017 (Year: 2017).*
Andre et al. Oxaliplatin, Fluorouracil, and Leucovorin as Adjuvant Treatment for Colon Cancer. NEJM. 350: 2343-2351; Published: Jun. 3, 2004 (Year: 2004).*

(Continued)

*Primary Examiner* — Juliet C Switzer
*Assistant Examiner* — Katherine Ann Holtzman
(74) *Attorney, Agent, or Firm* — LATHROP GPM LLP; James H. Velema, Esq.

(57) ABSTRACT

A method of predicting resistance to anti-PD1 therapy in a subject suffering from cancer comprising the steps of a) determining, from a biological sample from a subject, in particular a feces or colonic biopsy sample from the subject, the presence of a bacterial pks island, b) predicting from the result of step a) that the subject is likely to be resistant to anti-PD1 therapy, is provided. Methods of treating cancer in a subject by assessing the presence or absence of bacterial pks island in a biological sample from a subject, in particular a feces or colonic biopsy sample from the subject and administering to the subject an anti-cancer therapy are also provided.

13 Claims, 12 Drawing Sheets

Specification includes a Sequence Listing.

(56) References Cited

OTHER PUBLICATIONS

Buc et al. High Prevalence of Mucosa-Associated *E. coli* Producing Cyclomodulin and Genotoxin in Colon Cancer. PLoS ONE. 8(2): e56964; Published: Feb. 14, 2013 (Year: 2013).*

Buc et al., "High Prevalence of Mucosa-Associated *E. coli* Producing Cyclomodulin and Genotoxin in Colon Cancer", PLOS ONE, Feb. 14, 2013, 8(2): e56964.

Extended European Search Report for European Patent Application No. 18306661.2, mailed Jul. 4, 2019.

Faïs et al., "Colibactin: More Than a New Bacterial Toxin", Toxins (Basel), Apr. 10, 2018, 10(4): 151.

International Search Report and Written Opinion for PCT International Patent Application No. PCT/EP2019/084487, mailed Feb. 13, 2020.

Regeneron, "FDA Approves Libtayo® (Cemiplimab-Rwlc) as First and Only Treatment for Advanced Cutaneous Squamous Cell Carcinoma", Sep. 28, 2018.

Buc et al., "High prevalence of mucosa-associated *E. coli* producing cyclomodulin and genotoxin in colon cancer", PLoS One, Feb. 2013, 8(2): e56964, 10 pages.

European Search Report for European Patent Application No. 18306661.2, mailed Jul. 4, 2019, 5 pages.

Fais et al., "Colibactin: More Than a New Bacterial Toxin", Toxins, Apr. 2018, 10(4): 151, 16 pages.

International Search Report for PCT International Patent Application No. PCT/EP2019/084487, mailed Feb. 13, 2020, 6 pages.

* cited by examiner

SEQUENCE LISTING

<160> NUMBER OF SEQ ID NOS: 4

<210> SEQ ID NO 1
<211> LENGTH: 24
<212> TYPE: DNA
<213> ORGANISM: Artificial Sequence
<220> FEATURE:
<223> OTHER INFORMATION: ClbN forward primer

<400> SEQUENCE: 1
gttttgctcg ccagatagtc attc        24

<210> SEQ ID NO 2
<211> LENGTH: 22
<212> TYPE: DNA
<213> ORGANISM: Artificial Sequence
<220> FEATURE:
<223> OTHER INFORMATION: ClbN reverse primer -continued

<400> SEQUENCE: 2
cagttcgggt atgtgtggaa gg                                      22

<210> SEQ ID NO 3
<211> LENGTH: 218
<212> TYPE: PRT
<213> ORGANISM: Artificial Sequence
<220> FEATURE:
<223> OTHER INFORMATION: RPM1-14 light chain, without SP chimeric mouse
      Variable rat Constant Kappa

<400> SEQUENCE: 3

Asp Ile Val Met Thr Gln Gly Thr Leu Pro Asn Pro Val Pro Ser Gly
1               5                   10                  15

Glu Ser Val Ser Ile Thr Cys Arg Ser Ser Lys Ser Leu Leu Tyr Ser
            20                  25                  30

Asp Gly Lys Thr Tyr Leu Asn Trp Tyr Leu Gln Arg Pro Gly Gln Ser
        35                  40                  45

Pro Gln Leu Leu Ile Tyr Trp Met Ser Thr Arg Ala Ser Gly Val Ser
    50                  55                  60

Asp Arg Phe Ser Gly Ser Gly Ser Gly Thr Asp Phe Thr Leu Lys Ile
65                  70                  75                  80

Ser Gly Val Glu Ala Glu Asp Val Gly Ile Tyr Tyr Cys Gln Gln Gly
                85                  90                  95

Leu Glu Phe Pro Thr Phe Gly Gly Gly Thr Lys Leu Glu Leu Lys Arg
            100                 105                 110

Ala Asp Ala Ala Pro Thr Val Ser Ile Phe Pro Pro Ser Ser Glu Gln
        115                 120                 125

Leu Thr Ser Gly Gly Ala Ser Val Val Cys Phe Leu Asn Asn Phe Tyr
    130                 135                 140

Pro Lys Asp Ile Asn Val Lys Trp Lys Ile Asp Gly Ser Glu Arg Gln
145                 150                 155                 160

Asn Gly Val Leu Asn Ser Trp Thr Asp Gln Asp Ser Lys Asp Ser Thr
                165                 170                 175

Tyr Ser Met Ser Ser Thr Leu Thr Leu Thr Lys Asp Glu Tyr Glu Arg
            180                 185                 190

His Asn Ser Tyr Thr Cys Glu Ala Thr His Lys Thr Ser Thr Ser Pro
        195                 200                 205

Ile Val Lys Ser Phe Asn Arg Asn Glu Cys
    210                 215

<210> SEQ ID NO 4
<211> LENGTH: 443
<212> TYPE: PRT
<213> ORGANISM: Artificial Sequence
<220> FEATURE:
<223> OTHER INFORMATION: RMP1-14 heavy chain, without SP mouse variable,
      mouse constant IgG1

<400> SEQUENCE: 4

Glu Val Gln Leu Gln Glu Ser Gly Pro Gly Leu Val Lys Pro Ser Gln
1               5                   10                  15

Ser Leu Ser Leu Thr Cys Ser Val Thr Gly Tyr Ser Ile Thr Ser Ser
            20                  25                  30

Tyr Arg Trp Asn Trp Ile Arg Lys Phe Pro Gly Asn Arg Leu Glu Trp
        35                  40                  45

Met Gly Tyr Ile Asn Ser Ala Gly Ile Ser Asn Tyr Asn Pro Ser Leu

```
                50                  55                  60
Lys Arg Arg Ile Ser Ile Thr Arg Asp Thr Ser Lys Asn Gln Phe Phe
 65                  70                  75                  80

Leu Gln Val Asn Ser Val Thr Glu Asp Ala Ala Thr Tyr Tyr Cys
                 85                  90                  95

Ala Arg Ser Asp Asn Met Gly Thr Thr Pro Phe Thr Tyr Trp Gly Gln
                100                 105                 110

Gly Thr Leu Val Thr Val Ser Ser Ala Lys Thr Thr Pro Pro Ser Val
                115                 120                 125

Tyr Pro Leu Ala Pro Gly Ser Ala Ala Gln Thr Asn Ser Met Val Thr
130                 135                 140

Leu Gly Cys Leu Val Lys Gly Tyr Phe Pro Glu Pro Val Thr Val Thr
145                 150                 155                 160

Trp Asn Ser Gly Ser Leu Ser Ser Gly Val His Thr Phe Pro Ala Val
                165                 170                 175

Leu Gln Ser Asp Leu Tyr Thr Leu Ser Ser Val Thr Val Pro Ser
                180                 185                 190

Ser Thr Trp Pro Ser Glu Thr Val Thr Cys Asn Val Ala His Pro Ala
                195                 200                 205

Ser Ser Thr Lys Val Asp Lys Lys Ile Val Pro Arg Asp Cys Gly Cys
210                 215                 220

Lys Pro Cys Ile Cys Thr Val Pro Glu Val Ser Ser Val Phe Ile Phe
225                 230                 235                 240

Pro Pro Lys Pro Lys Asp Val Leu Thr Ile Thr Leu Thr Pro Lys Val
                245                 250                 255

Thr Cys Val Val Val Asp Ile Ser Lys Asp Asp Pro Glu Val Gln Phe
                260                 265                 270

Ser Trp Phe Val Asp Asp Val Glu Val His Thr Ala Gln Thr Gln Pro
                275                 280                 285

Arg Glu Glu Gln Phe Asn Ser Thr Phe Arg Ser Val Ser Glu Leu Pro
290                 295                 300

Ile Met His Gln Asp Trp Leu Asn Gly Lys Glu Phe Lys Cys Arg Val
305                 310                 315                 320

Asn Ser Ala Ala Phe Pro Ala Pro Ile Glu Lys Thr Ile Ser Lys Thr
                325                 330                 335

Lys Gly Arg Pro Lys Ala Pro Gln Val Tyr Thr Ile Pro Pro Pro Lys
                340                 345                 350

Glu Gln Met Ala Lys Asp Lys Val Ser Leu Thr Cys Met Ile Thr Asp
                355                 360                 365

Phe Phe Pro Glu Asp Ile Thr Val Glu Trp Gln Trp Asn Gly Gln Pro
370                 375                 380

Ala Glu Asn Tyr Lys Asn Thr Gln Pro Ile Met Asp Thr Asp Gly Ser
385                 390                 395                 400

Tyr Phe Val Tyr Ser Lys Leu Asn Val Gln Lys Ser Asn Trp Glu Ala
                405                 410                 415

Gly Asn Thr Phe Thr Cys Ser Val Leu His Glu Gly Leu His Asn His
                420                 425                 430

His Thr Glu Lys Ser Leu Ser His Ser Pro Gly
                435                 440
```

PKS-ISLAND POSITIVE *E. coli* AS MARKER OF NEGATIVE RESPONSE TO ANTI-PD1 THERAPY IN COLORECTAL CANCER

RELATED APPLICATIONS

This application is a 35 U.S.C. § 371 filing of International Patent Application No. PCT/EP2019/084487, filed Dec. 10, 2019, which claims priority to European Patent Application No. 18306661.2, filed Dec. 11, 2018, the entire disclosures of which are hereby incorporated herein by reference.

The present invention concerns a method for selecting patients suffering from colorectal cancer for anti-PD1 therapy.

BACKGROUND

Colorectal cancer (CRC) is the third most common malignancy and is the fourth leading cause of cancer-related deaths in men and the third leading cause among women worldwide. It presents a high therapeutic need. Indeed, for most patients with metastatic CRC, chemotherapy is the only viable possibility. However, anti-PD1 immunotherapy was recently approved by the Food and Drug Administration as a second-line treatment of a specific subgroup of patients.

Anti-checkpoint antibodies (such as the anti-PD1 antibody nivolumab and the anti-CTLA4 antibody ipilimumab) are a new class of antibodies that are very promising molecules in cancer treatment of various malignancies such as multiple melanoma, lung, bladder, lymphoma and CRC. However, only a minority of patients is responding well to the treatment. Indeed, the results of the major clinical trials reveal that around 40-60% of patients do not respond satisfactorily to these therapies.

Accordingly, it is crucial to have biomarkers which can efficiently predict the response of a patient suffering from CRC to anti-PD1 therapy.

Some biomarkers have been proposed for predicting efficacy of anti-PD1 therapy. For example, PD-L1 overexpression is an important and widely-explored predictive biomarker for the response to anti-PD1 therapies. However, PD-L1 staining cannot be used to accurately select patients for anti-PD1 therapies due to the low prediction accuracy and dynamic changes of the expression. Tumor-infiltrating immune cells and molecules in the tumor microenvironment, or along with PD-L1 expression, may be important in predicting clinical benefits of anti-PD1 therapies. To the inventors' knowledge however, no simple technology is available so far for selecting CRC patients responding to anti-PD1 treatment, in particular sporadic MSS (Microsatellite Stable) CRC patients. There is thus still an important need of biomarkers for predicting the response of a CRC patient to an anti-PD1 therapy.

The present invention meets this need.

Host factors associated with environmental and nutritional factors play an important role in the colorectal carcinogenesis. In the recent two decades, growing attention has been given to the role of intestinal microbiota in CRC-carcinogenesis. Studies showed a reduction of tumorigenesis in the intestines of animals raised in a germ-free environment, in both genetically induced and colitis-associated CRC mouse models. Moreover, colorectal cancer patients often exhibit a distinct microbiota compared to healthy population. However, mechanisms by which intestinal microbiota dysbiosis has been shown to promote colorectal carcinogenesis are not yet elucidated. Recently, Wong et al. (2017) *Gastroenterology* 153:1621-1633 showed that gavage with stools from colorectal cancer patients promote intestinal carcinogenesis in germ-free and azoxymethane-(AOM)-carcinogen mice models. Despite the large number of studies, CRC associated dysbiosis is partly defined. However, some bacterial strains, such as *Bacteroides fragilis, Fusobacterium nucleatum* and *Escherichia coli*, have a well-established role in CRC development.

Even though *E. coli* is a commensal bacterium, several strains have acquired some virulence factors including genotoxins, such as colibactin. The colibactin toxin, a hybride polyketide non-ribosomal peptide is encoded by the polyketide synthase (pks) pathogenicity island (Johnson et al. (2008) *J. Clin. Microbiol.* 46:3906-3911). These *E. coli* bearing pks island were preferentially detected in CRC samples in comparison to non-neoplasic control (Arthur et al. (2012) *Science* 338:120-123, Buc et al. (2013) *PLoS ONE* 8:e56964). The mechanisms by which CRC-associated *E. coli* promote colorectal carcinogenesis are diverse and somewhat specific to the animal models and the microbial status of the animals (germ-free or SPF). However, modulation of immune response and inflammation seems to play a central role in these mechanisms.

Interestingly, metagenomics whole genome sequencing (WGS) of gut microbiome in patients suffering from melanoma and treated with anti-PD1 therapy showed an enrichment notably in *Escherichia coli* in non-responders (Gopalakrishnan et al. (2018) *Science* 359:97-103).

SUMMARY

The present invention arises from the unexpected finding by the inventors that the presence of *E. coli* bearing pks island in mice subcutaneously implanted with MC38 tumor prevented the activity of an anti-PD1 antibody, whereas said anti-PD1 antibody was efficient in mice implanted with MC38 tumor but having a natural microbiota. Accordingly, the presence of *E. coli* harboring the pks island in patient stools or colonic biopsies can be predictive of patient resistance to anti-PD1 therapy.

The present invention thus concerns a method of predicting resistance to anti-PD1 therapy in a subject suffering from cancer, said method comprising the steps of:
  a) determining, from a biological sample from the subject, in particular a feces or a colonic biopsy sample from the subject, the presence of a pks island,
  b) predicting from the result of step a) that the subject is likely to be resistant to anti-PD1 therapy.

In a particular embodiment, the presence of a pks island is determined in step a) by determining the presence of *Escherichia coli* bacteria positive for pks island.

In a particular embodiment, said cancer is colorectal cancer.

In a particular embodiment, the presence of a pks island is determined in step a) by determining the presence of a pks island DNA.

In another particular embodiment, the presence of a pks island DNA is determined by PCR.

In a particular embodiment wherein the presence of a pks island is determined in step a) by determining the presence of *Escherichia coli* bacteria positive for a pks island, the presence of *Escherichia coli* bacteria positive for a pks island is determined by isolation of *E. coli* bacteria on agar and determination of the presence of a pks island DNA, in particular by PCR.

In another particular embodiment wherein the presence of a pks island is determined in step a) by determining the presence of *Escherichia coli* bacteria positive for a pks island, the presence of *Escherichia coli* bacteria positive for a pks island is determined by detecting the presence of an *E. coli*-specific DNA, in particular by PCR, and determining the presence of a pks island DNA, in particular by PCR.

In a particular embodiment, the determination of the presence of a pks island DNA by PCR is carried out by determining the presence, by PCR, of at least one, in particular two, genes of the pks island.

In still another embodiment, the anti-PD-1 therapy is a therapy with cemiplimab.

Another object of the invention is a method for selecting therapy to treat a subject suffering from cancer, said method comprising the steps of:
  a) determining, from a biological sample from the subject, in particular a feces sample or colonic biopsy from the subject, the presence of a pks island,
  b) when it is determined in step a) that said pks island is present, selecting for said subject an anti-cancer therapy which is not an anti-PD-1 therapy.

In a particular embodiment, the presence of a pks island is determined in step a) by determining the presence of *Escherichia coli* bacteria positive for pks island.

In a particular embodiment, said cancer is colorectal cancer.

In a particular embodiment, the anti-cancer therapy which is not an anti-PD-1 therapy is selected from the group consisting of irinotecan, oxaliplatin, combination of irinotecan with 5-FU and leucovorin, combination of oxaliplatin with 5-FU and leucovorin, combination of irinotecan with capecitabine, combination of oxaliplatin and capecitabine, anti-EGFR antibodies such as cetuximab and panitumumab, anti-VEGFR antibodies such as bevacizumab, anti-VEGFR2 antibodies such as ramucirumab, aflibercept, zivaflibercept, regorafenib, combination of trametinib and palbociclib, Reolysin®, combination of dabrafenib, trametiniv and panitumumab, and combinations thereof.

The present invention also concerns an anti-cancer therapy which is not an anti-PD-1 therapy for use in a method for treating a subject suffering from cancer, said method comprising:
  a) determining, from a biological sample from the subject, in particular a feces or colonic biopsy sample, from the subject, the presence of a pks island,
  b) when it is determined in step a) that said pks island is present, administering to said subject a therapeutically effective amount of said anti-cancer therapy which is not an anti-PD-1 therapy.

In a particular embodiment, the presence of a pks island is determined in step a) by determining the presence of *Escherichia coli* bacteria positive for pks island.

In a particular embodiment, said cancer is colorectal cancer.

The present invention also concerns an anti-PD1 and/or anti-PDL1 antibody for use in a method for treating a subject suffering from cancer, said method comprising:
  a) determining, from a biological sample from the subject, in particular a feces or colonic biopsy sample from the subject, the presence of a pks island,
  b) when it is determined in step a) that said pks island is absent, administering to said subject a therapeutically effective amount of an anti-PD-1 and/or anti-PDL1 antibody.

In a particular embodiment, the presence of a pks island is determined in step a) by determining the presence of *Escherichia coli* bacteria positive for pks island.

In a particular embodiment, said cancer is colorectal cancer.

In a particular embodiment, said anti-PD1 or anti-PDL1 antibody is cemiplimab.

The present invention further concerns a method for treating a subject suffering from cancer, said method comprising the steps of:
  a) determining, from a biological sample from the subject, in particular a feces or colonic biopsy sample from the subject, the presence of a pks island,
  b) when it is determined in step a) that said pks island is present, administering to said subject a therapeutically effective amount of an anti-cancer therapy which is not an anti-PD-1 therapy; or
  when it is determined in step a) that said pks island is absent, administering to said subject a therapeutically effective amount of an anti-PD-1 therapy.

In a particular embodiment, the presence of a pks island is determined in step a) by determining the presence of *Escherichia coli* bacteria positive for pks island.

In a particular embodiment, said cancer is colorectal cancer.

In another particular embodiment, said anti-cancer therapy which is not an anti-PD-1 therapy is selected from the group consisting of irinotecan, oxaliplatin, combination of irinotecan with 5-FU and leucovorin, combination of oxaliplatin with 5-FU and leucovorin, combination of irinotecan with capecitabine, combination of oxaliplatin and capecitabine, anti-EGFR antibodies such as cetuximab and panitumumab, anti-VEGFR antibodies such as bevacizumab, anti-VEGFR2 antibodies such as ramucirumab, aflibercept, zivaflibercept, regorafenib, combination of trametinib and palbociclib, Reolysin®, combination of dabrafenib, trametiniv and panitumumab, and combinations thereof.

In another particular embodiment, said anti-PD1 therapy is a therapy with cemiplimab.

The present invention also relates to a method of predicting resistance to anti-PD-1 therapy in a subject suffering from cancer, said method comprising the steps of:
  a) optionally isolating, on agar, *E. coli* bacteria from biological sample from the subject, in particular a feces or colonic biopsy sample from the subject or performing PCR on said biological sample using primers specific for *E. coli* bacteria, to detect whether *E. coli* bacteria are present,
  b) performing PCR on said biological sample from the subject using primers specific for a pks gene island, in particular specific for a gene selected from the group consisting of the ClbH, ClbJ, ClbN, ClbC, ClbI, ClbO, ClbB and ClbK genes, to detect whether a pks island is present,
  and
  c) predicting from the result of step b) that the subject is resistant to anti-PD-1 therapy if a pks island is present.

In a particular embodiment, the method comprises step a) of isolating, on agar, *E. coli* bacteria from biological sample from the subject, in particular a feces or colonic biopsy sample from the subject or performing PCR on said biological sample using primers specific for *E. coli* bacteria, to detect whether *E. coli* bacteria are present, and step c) consists in predicting from the results of steps a) and b) that the subject is resistant to anti-PD-1 therapy if an *Escherichia coli* bacteria positive for pks island is present.

According to a particular embodiment, the primers specific for a gene selected from the group consisting of the ClbH, ClbJ, ClbN, ClbC, ClbI, ClbO, ClbB and ClbK genes are specific for a ClbN gene of the pks island.

According to another particular embodiment, the PCR is performed using one or both of a primer comprising SEQ ID NO: 1 and a primer comprising SEQ ID NO: 2.

In an alternative embodiment, the method of predicting resistance to anti-PD-1 therapy comprises the steps of:
a) sequencing the microbiota from a biological sample, in particular a feces or colonic biopsy sample from the subject,
b) determining, from the sequencing performed in step a), the presence of a pks island, in particular of an *Escherichia coli* bacteria positive for pks island, and
c) predicting from the result of step b) that the subject is resistant to anti-PD-1 therapy if a pks island, in particular an *Escherichia coli* bacteria positive for pks island is present.

According to another embodiment, said cancer is colorectal cancer.

According to another embodiment, the anti-PD-1 therapy is a therapy with cemiplimab.

The present invention further concerns a method for selecting therapy to treat a subject suffering from cancer, said method comprising the steps of:
a) optionally isolating, on agar, *E. coli* bacteria from biological sample from the subject, in particular a feces or colonic biopsy sample from the subject or performing PCR on said biological sample using primers specific for *E. coli* bacteria, to detect whether *E. coli* bacteria are present,
b) performing PCR on said biological sample from the subject using primers specific for a pks island gene in particular specific for a gene selected from the group consisting of the ClbH, ClbJ, ClbN, ClbC, ClbI, ClbO, ClbB and ClbK genes to detect whether a pks island is present, and
c) if it is determined in step b) that said pks island is present, selecting for said subject an anti-cancer therapy which is not an anti-PD-1 therapy.

In a particular embodiment, the method comprises step a) of isolating, on agar, *E. coli* bacteria from biological sample from the subject, in particular a feces or colonic biopsy sample from the subject or performing PCR on said biological sample using primers specific for *E. coli* bacteria, to detect whether *E. coli* bacteria are present, and step c) consists in selecting for said subject an anti-cancer therapy which is not an anti-PD-1 therapy if it is determined from steps a) and b) that an *Escherichia coli* bacteria positive for pks island is present.

According to a particular embodiment, the primers specific for a gene selected from the group consisting of the ClbH, ClbJ, ClbN, ClbC, ClbI, ClbO, ClbB and ClbK genes are specific for a ClbN gene of the pks island.

According to another particular embodiment, the PCR is performed using one or both of a primer comprising SEQ ID NO: 1 and a primer comprising SEQ ID NO: 2.

In an alternative embodiment, the method of predicting resistance to anti-PD-1 therapy comprises the steps of:
a) sequencing the microbiota from a biological sample, in particular a feces or colonic biopsy sample from the subject,
b) determining, from the sequencing performed in step a), the presence of a pks island, in particular of an *Escherichia coli* bacteria positive for pks island, and
c) if it is determined in step b) that a pks island, in particular an *Escherichia coli* bacteria positive for pks island is present, selecting for said subject an anti-cancer therapy which is not an anti-PD-1 therapy.

According to another embodiment, said cancer is colorectal cancer.

According to another embodiment, the anti-cancer therapy which is not an anti-PD-1 therapy is selected from the group consisting of irinotecan, oxaliplatin, combination of irinotecan with 5-FU and leucovorin, combination of oxaliplatin with 5-FU and leucovorin, combination of irinotecan with capecitabine, combination of oxaliplatin and capecitabine, anti-EGFR antibodies such as cetuximab and panitumumab, anti-VEGFR antibodies such as bevacizumab, anti-VEGFR2 antibodies such as ramucirumab, aflibercept, zivaflibercept, regorafenib, combination of trametinib and palbociclib, Reolysin®, combination of dabrafenib, trametiniv and panitumumab, and combinations thereof.

The present invention further concerns a method for treating a subject suffering from cancer, said method comprising:
a) determining, from a biological sample from the subject, in particular a feces or colonic biopsy sample from the subject, the presence of a pks island,
b) if it is determined in step a) that said pks island is absent, administering to said subject a therapeutically effective amount of an anti-PD-1 and/or anti-PDL1 antibody.

In a particular embodiment, the presence of a pks island is determined in step a) by determining the presence of *Escherichia coli* bacteria positive for pks island.

According to a particular embodiment, said cancer is colorectal cancer.

According to another particular embodiment, said anti-PD1 and/or anti-PDL1 antibody is cemiplimab.

According to another embodiment, the method further comprises administering an additional anti-cancer therapy.

According to another embodiment, the additional anti-cancer therapy is selected from the group consisting of immune checkpoint inhibitors, radiation therapy, surgery, small molecule kinase inhibitors, chemotherapeutic agents including platinum-based chemotherapeutic agents, nucleic acid synthesis inhibitors, cancer vaccines, anti-CD38 antibodies, anti-MUC16×CD3 bispecific antibodies, anti-CD20×CD3 bispecific antibodies, granulocyte-macrophage colony-stimulating factor (GM-CSF), anti-TGFβ antibodies, an indoleamine-2,3-dioxygenase (IDO) inhibitor, an IL-6R inhibitor, an IL-4R inhibitor, an IL-10 inhibitor, a cytokine such as IL-2, IL-7, IL-21, and IL-15, an anti-inflammatory drug, and combinations thereof.

According to another embodiment, the additional anti-cancer therapy is radiation therapy which is selected from the group consisting in hypofractionated radiation therapy and stereotactic body radiation therapy.

According to another embodiment, the additional anti-cancer therapy is small molecule kinase inhibitors selected from the group consisting in sorafenib and ceritinib.

According to another embodiment, the additional anti-cancer therapy is chemotherapeutic agents selected from the group consisting in paclitaxel, pemetrexed and gemcitabine.

According to another embodiment, the additional anti-cancer therapy is platinum-based chemotherapeutic agents selected from the group consisting in carboplatin and cisplatin.

According to another embodiment, the additional anti-cancer therapy is a nucleic acid synthesis inhibitor which is decitabine.

According to another embodiment, the additional anticancer therapy is a cancer vaccine which is ISA101b.

According to another embodiment, the additional anticancer therapy is an anti-TGFβ antibody which is SAR439459.

According to another embodiment, the additional anticancer therapy is an anti-inflammatory drug selected from the group consisting in corticosteroids and non-steroidal anti-inflammatory drugs.

The present invention further concerns a method for treating a subject suffering from cancer, said method comprising the steps of:
- a) determining, from a biological sample from the subject, in particular a feces or colonic biopsy sample from the subject, the presence of a pks island,
- b) when it is determined in step a) that said pks island is present, administering to said subject a therapeutically effective amount of an anti-cancer therapy which is not an anti-PD-1 therapy; or
when it is determined in step a) that said pks island is absent, administering to said subject a therapeutically effective amount of an anti-PD-1 therapy.

In a particular embodiment, the presence of a pks island is determined in step a) by determining the presence of *Escherichia coli* bacteria positive for pks island.

According to a particular embodiment, said cancer is colorectal cancer.

According to another particular embodiment, the anticancer therapy which is not an anti-PD-1 therapy is selected from the group consisting of irinotecan, oxaliplatin, combination of irinotecan with 5-FU and leucovorin, combination of oxaliplatin with 5-FU and leucovorin, combination of irinotecan with capecitabine, combination of oxaliplatin and capecitabine, anti-EGFR antibodies such as cetuximab and panitumumab, anti-VEGFR antibodies such as bevacizumab, anti-VEGFR2 antibodies such as ramucirumab, aflibercept, zivaflibercept, regorafenib, combination of trametinib and palbociclib, Reolysin®, combination of dabrafenib, trametiniv and panitumumab, and combinations thereof.

According to another particular embodiment, said anti-PD1 therapy is a therapy with cemiplimab.

BRIEF DESCRIPTION OF THE FIGURES

FIG. 1: Level of 11G5-bacterial colonization (in CFU/g of feces) in feces of mice injected with isotype control (11G5+ isotype control, circles) or with RMP1-14 antibodies (11G5+Ab, squares).

FIG. 2: Level of 11G5-bacterial colonization (in CFU/g of tissue) in colonic tissue of mice injected with isotype control (11G5 isotype control) or with RMP1-14 antibodies (11G5 Ab).

FIG. 3: Response to PD-1 based immunotherapy as assessed by the MC38 tumoral volume (mm$^3$) in RMP1-14 treated animals (PBS+Ab, triangles) versus untreated animals (PBS+isotype CTL, squares).

FIG. 4: Lack of response of PD-1 based immunotherapy in mice preinfected with pks+*E. coli* 11G5 strain, as assessed by MC38 tumoral volume (mm3) in animals treated (11G5+ Ab, triangles) or not (11G5+isotype CTL, squares) with RMP1-14 antibody.

FIG. 7: Representative flow cytometry plots to assess percentages of CD3$^+$ T-cells among live CD45$^+$ leucocytes in grafted MC38 tumors for each group of mice.

FIG. 8: Significant decrease of percentages of CD3$^+$ T-cells among live CD45$^+$ leucocytes in tumors of 11G5-infected mice compared to control mice (means plus SEM).

FIG. 9: Representative flow cytometry plots to assess percentages of CD8$^+$CD3$^+$ T-cells among live CD45$^+$ leucocytes in grafted MC38 tumors for each group of mice.

FIG. 10: Significant decrease of percentages of CD8$^+$ CD3$^+$ T-cells among live CD45$^+$ leucocytes in tumors of 11G5-infected mice compared to control mice (means plus SEM).

FIG. 11: Representative flow cytometry plots to assess percentages of neutrophils (CD11b$^+$Ly6G$^+$Ly6C$^-$ cells) among live CD45$^+$ leucocytes in grafted MCD38 tumors for each group of mice.

FIG. 12: Significant increase of percentages of neutrophils among live CD45$^+$ leucocytes in tumors of 11G5-infected mice compared to control mice (means plus SEM).

DETAILED DESCRIPTION OF THE INVENTION

Figure 1:
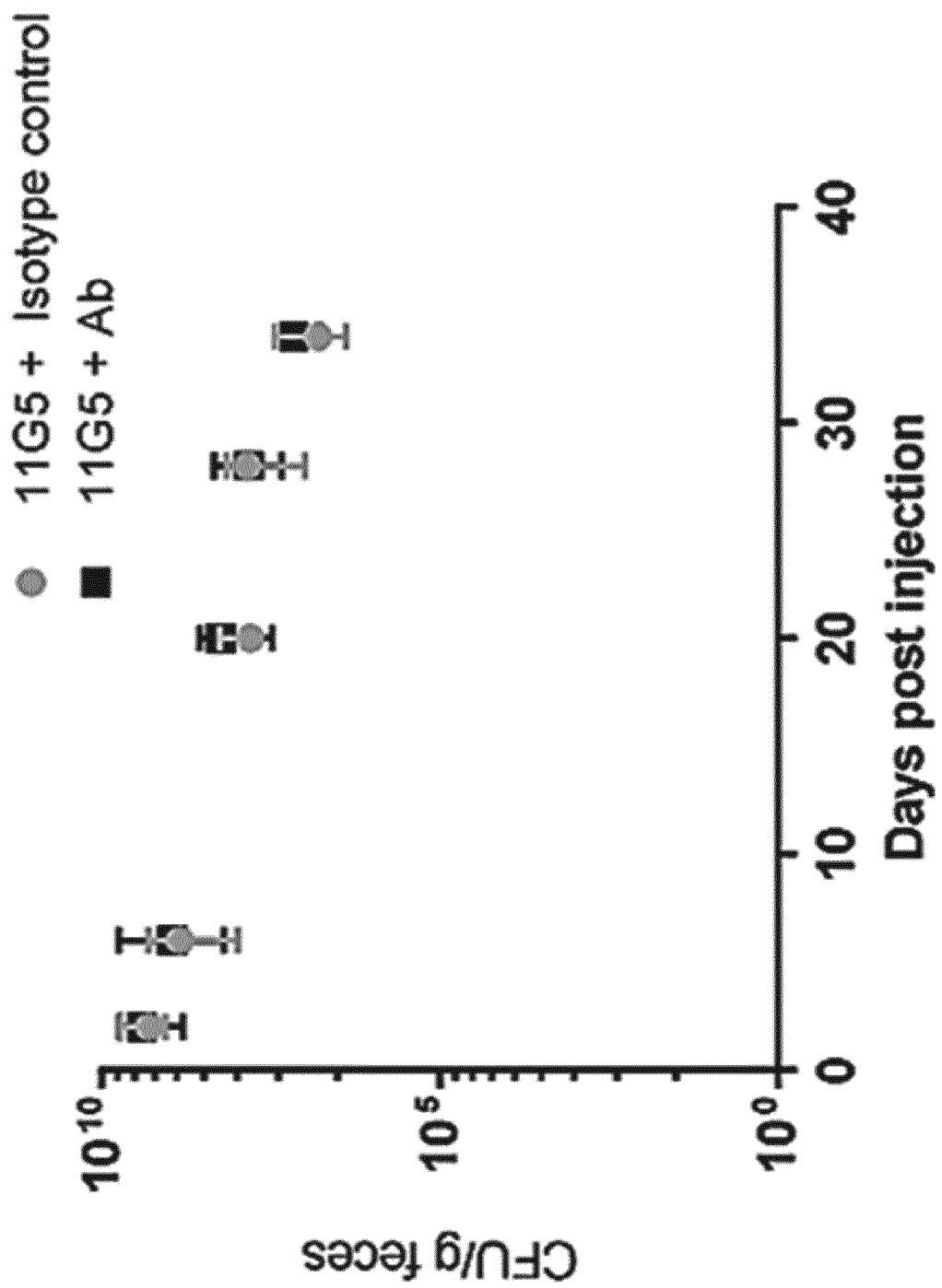
FIGS. 1-4. Lack of anti-tumoral effect of PD-1 based immunotherapy on growth rate of MC38 murine colonic tumors in pks *E. coli* pre-infected mice.

In the context of the invention, the term "cancer" refers to any cancer for which anti-PD1 therapy can be contemplated. Examples of such cancers include colorectal cancer in particular progressive metastatic colorectal cancer, multiple melanoma, lung cancer in particular non-small cell lung cancer, bladder cancer, lymphoma in particular Hodgkin's lymphoma, B cell lymphoma or follicular lymphoma, renal cell carcinoma, squamous-cell carcinoma of the head and neck, ovarian cancer, Merkel cell carcinoma and urothelial carcinoma.

In a particular embodiment, said cancer is melanoma or colorectal cancer, more particularly colorectal cancer.

In a more particular embodiment, said colorectal cancer is Microsatellite Stable (MSS) colorectal cancer.

"Subject" for the purposes of the present invention includes humans and other animals, particularly mammals, and other organisms. Thus the methods are applicable to both human therapy and veterinary applications. In a particular embodiment the subject is a mammal, and in a more particular embodiment the subject is human.

The methods of the present invention comprise a step a) of determining, from a biological sample from the subject, as defined above, the presence of a pks island.

By "biological sample" is meant herein a sample obtained from the gastrointestinal tract of the subject such as a feces sample or a colonic biopsy sample.

By "pks island" is meant herein a 54 kb genomic island comprising a total of 19 genes (clbA to clbS) which encode the machinery enabling the production of colibactin. This machinery consists of three non-ribosomal peptide megasynthases (ClbH, ClbJ, ClbN), three polyketide megasynthases (ClbC, ClbI, ClbO), two hybrid NRPS/PKS megasynthases (ClbB, ClbK), and nine accessory, tailoring and editing enzymes.

According to the present invention, the determination of the presence of a pks island is carried out by determining the presence of at least one expression product or expression product derivative of the pks island or by determining the presence of a pks island DNA.

By "at least one expression product of the pks island" is meant herein at least one protein or mRNA encoded by at least one of the 19 genes of the pks island, in particular at least one of the ClbH, ClbJ, ClbN, ClbC, ClbI, ClbO, ClbB and ClbK genes.

By "expression product derivative of the pks island" is meant herein the metabolites, intermediate products and toxins, such as colibactin, produced via the machinery encoded by the pks island as defined above, in particular via the enzymes encoded by at least one of the ClbH, ClbJ, ClbN, ClbC, ClbI, ClbO, ClbB and ClbK genes.

The determination of the presence of at least one expression product of the pks island can be performed by any technique well-known from the skilled person, such as by Western Blot, enzyme-linked immunosorbent assay, immunochemistry, RT-PCR or qPCR.

The determination of the presence of at least one expression product derivative of the pks island can be performed by any technique well-known from the skilled person, such as by Western Blot, enzyme-linked immunosorbent assay or immunochemistry.

In a particular embodiment, the determination of the presence of a pks island is determined by comparing the determined level of said pks island with a predetermined threshold value. Statistical methods for determining appropriate threshold values will be readily apparent to the skilled person. The threshold values may have been determined, if necessary, from samples of subjects known to contain (positive control) or not to contain (negative control) pks islands.

In a particular embodiment, the presence of a pks island is determined in step a) by determining the presence of pks island DNA.

By "pks island DNA" is meant herein a nucleic acid included in the pks island, said nucleic acid being of at least 25 bp, in particular of at least 50 bp, at least 100 bp, at least 200 bp, at least 300 bp, at least 400 bp, at least 500 bp, at least 600 bp, at least 700 bp, at least 800 bp, at least 900 bp, at least 1000 bp, at least 2000 bp, at least 3000 bp, at least 4000 bp, at least 5000 bp, at least 6000 bp, at least 7000 bp, at least 8000 bp, at least 9000 bp, at least 10 000 bp, at least 20 000 bp, at least 30 000 bp, at least 40 000 bp, or at least 50 000 bp.

A pks island DNA may be in particular a nucleic acid included in at least one of the 19 genes of the pks island, in particular at least one of the ClbH, ClbJ, ClbN, ClbC, ClbI, ClbO, ClbB and ClbK genes. For instance, the pks island DNA is a nucleic acid included in the ClbN gene of the pks island.

The determination of the presence of a pks island DNA can be performed by any technique well-known from the skilled person, such as by PCR, using specific probes typically on a DNA chip, or by sequencing.

In a particular embodiment, the determination of the presence of a pks island DNA is performed by PCR.

In a particular embodiment, the determination of the presence of a pks island DNA is performed by determining the presence, by PCR, of at least one, in particular two, genes of the pks island, as defined above, in particular at least one, in particular two, genes selected from the group consisting of the ClbH, ClbJ, ClbN, ClbC, ClbI, ClbO, ClbB and ClbK genes.

In a particular embodiment, the determination of the presence of a pks island DNA is performed by PCR using primers specific for a pks island gene, in particular using primers respectively specific for at least one, in particular two, genes of the pks island, as defined above, in particular at least one, in particular two, genes selected from the group consisting of the ClbH, ClbJ, ClbN, ClbC, ClbI, ClbO, ClbB and ClbK genes.

In a particular embodiment, the determination of the presence of a pks island DNA is performed by PCR using primers specific for a pks island gene, in particular using primers specific for a ClbN gene of the pks island, more particularly using one or both of a primer comprising SEQ ID NO: 1 and a primer comprising SEQ ID NO: 2.

Typically, the presence of the pks island can be determined by the following method. Total DNA is preferably extracted from the feces sample to be studied. Then DNA amplification is preferably performed typically using a Taq DNA polymerase with primers, in particular 10 µM primers, typically located in the ClbN gene of the pks island. Suitable primers, disclosed in Johnson et al. (2008) *J. Clin. Microbiol.* 46:3906-3911, are typically of the following sequence:

```
Forward primer:
                             (SEQ ID NO: 1)
GTTTTGCTCGCCAGATAGTCATTC Reverse primer:
                             (SEQ ID NO: 2)
CAGTTCGGGTATGTGTGGAAGG.
```

In a particular embodiment, the presence of a pks island is determined by the determining the presence of *Escherichia coli* bacteria positive for pks island.

Determining the presence of *Escherichia coli* bacteria positive for pks island may be performed by any suitable method well-known from the skilled person.

In particular, determining the presence of *Escherichia coli* bacteria positive for pks island may be determined by isolation, on agar, of *E. coli* bacteria present in the sample, and determination of the presence of a pks island DNA, as disclosed above.

Isolation, on agar, of *E. coli* bacteria present in the sample, can typically be performed by culturing, in particular aerobically culturing, said sample on suitable culture medium, such as onto MacConkey agar plates, then morphologically characterizing the obtained colonies and further identifying Gram-negative colonies using suitable bacterial identification kits. Alternatively, isolation, on agar, of *E. coli* bacteria present in the sample, can typically be performed by culturing said sample on Drigalski agar and chromogenic agar chromID CPS3® (bioMérieux), which allow the identification of *E. coli*, and optionally by confirming said identification using automated Vitek II® system (bioMérieux). Typically, isolation, on agar, of *E. coli* bacteria present in the sample can be performed as disclosed in Buc et al. (2013) *PLoS ONE* 8:e56964.

Alternatively, the presence of *Escherichia coli* bacteria positive for pks island may be determined by determination of the presence of an *E. coli*-specific DNA in the sample, and determination of the presence of a pks island DNA, as disclosed above.

Determination of the presence of an *E. coli*-specific DNA in the sample can be performed by any method well-known from the skilled person, in particular by PCR.

In particular, determination of the presence of an *E. coli*-specific DNA can be performed by PCR using primers specific for *E. coli* bacteria.

Such primers specific for *E. coli* bacteria are well-known from the skilled person. Typically, primers specific for *E. coli* 16S DNA can be used, as disclosed in Sabat et al. (2000) *Applied Environ. Microbiol.* 66:844-849. Alternatively, primers specific for the *E. coli* uidA gene or primers specific for the *E. coli* flanking region of uspA gene can be used, as disclosed respectively in Choi et al. (2018) *Korean J. Food. Sci. Anim. Resour.* 38:829-834 and Chen and Griffiths (1998) *Lett. Appl. Microbiol.* 27:369-371.

Alternatively, determining the presence of *Escherichia coli* bacteria positive for pks island may be carried out by sequencing, DNA chip, FISH, Western Blot, enzyme-linked immunosorbent assay, immunochemistry, immunofluorescence, or global sequencing of the microbiota.

In the context of the invention, the term "anti-PD1 therapy" refers to any therapeutic treatment inhibiting or antagonizing the PD1/PDL1 pathway.

Anti-PD1 therapies are well-known from the skilled person and include anti-PD1 antibodies or antibody derivatives such as pembrolizumab, nivolumab, cemiplimab, spartalizumab (also known as PDR001; see, e.g., WO 2015/112900), tislelizumab (also known as BGB-A317; see, e.g., WO 2015/035606), camrelizumab (also known as SHR-1210; see e.g., WO 2015/085847), dostarlimab (also known as TSR-042; see, e.g., WO 2014/179664), sintilimab (also known as 161308; see, e.g., WO 2017/025016), MEDI0608 (formerly AMP-514; see, e.g., WO 2012/145493 and U.S. Pat. No. 9,205,148), PF-06801591 (see, e.g., WO 2016/092419), JS001 (see, e.g., WO 2014/206107), MGA012 (see, e.g., WO 2017/019846), AGEN2034 (see, e.g., WO 2017/040790), and JNJ-63723283 (see, e.g., WO 2017/079112), and anti-PDL1 antibodies or antibody derivatives such as atezolizumab, avelumab, durvalumab, BMS-936559 antibody or CK-301 antibody.

In a particular embodiment, the anti-PD1 therapy is a therapy using an anti-PD1 and/or anti-PDL1 antibody.

The terms "antibody", "immunoglobulin", or "Ig" may be used interchangeably herein. The term antibody includes, but is not limited to, synthetic antibodies, monoclonal antibodies, recombinantly produced antibodies, multispecific antibodies (including bispecific antibodies), human antibodies, humanized antibodies, chimeric antibodies, intrabodies, single-chain Fvs (scFv) (e.g., including monospecific, bispecific, trispecific etc.), camelized antibodies, single domain antibodies, Fab fragments, F(ab') fragments, disulfide-linked Fvs (sdFv), anti-idiotypic (anti-Id) antibodies, and epitope-binding fragments of any of the above, fusion proteins comprising the antigen-binding domain of an antibody, fusion proteins based on a PD-1 or PD-L1 ligand (i.e. "traps" such as fusion proteins comprising a PD-1 or PD-L1-binding domain of a natural PD-1 or PD-L1 ligand, fused to the Fc portion of an immunoglobulin) and any combination thereof. In particular, antibodies include immunoglobulin molecules and immunologically active portions of immunoglobulin molecules, i.e., antigen binding domains or molecules that contain an antigen-binding site that specifically binds to a PD-1 or PD-L1 antigen. The anti-PD1 or anti-PDL1 antibodies can be of any origin (human, murine or other), class (e.g., IgG, IgE, IgM, IgD, IgA and IgY) or subclass (e.g., IgG1, IgG2, IgG2a, IgG2b, IgG3, IgG4, IgA1 and IgA2). In particular embodiments, the anti-PD1 or anti-PDL1 antibodies are humanized, such as humanized monoclonal anti-PD1 and/or anti-PDL1 antibodies.

In a particular embodiment, the anti-PD1 therapy is a therapy with cemiplimab.

By "resistance to anti-PD1 therapy" is meant herein that the anti-PD1 treatment does not improve the health condition of the treated patient with respect to the disease to be treated. For example, the tumor growth is not reduced and/or slowed down, and/or the survival rate is not increased.

By "predicting resistance to anti-PD1 therapy" is meant herein determining the likelihood that an anti-PD1 therapy, as defined above, if administered to a patient, will not improve the health condition of said patient with respect to the disease to be treated.

As used herein, the term "anti-cancer therapy" refers to any protocol, method, and/or agent that can be used in the prevention, management, treatment, and/or amelioration of a cancer. In certain embodiments, the terms "therapies" and "therapy" refer to a biological therapy, supportive therapy, and/or other therapies useful in the prevention, management, treatment, and/or amelioration of cancer known to one of skill in the art, such as medical personnel.

By "anti-cancer therapy which is not an anti-PD1 therapy" is meant any therapy preferably known to have a beneficial effect on the particular cancer to be treated, which is not an anti-PD1 therapy as defined above.

Typically, when said cancer is a colorectal cancer, said anti-cancer therapy which is not an anti-PD1 therapy is selected from the group consisting of irinotecan, oxaliplatin, combination of irinotecan with 5-FU and leucovorin, combination of oxaliplatin with 5-FU and leucovorin, combination of irinotecan with capecitabine, combination of oxaliplatin and capecitabine, anti-EGFR antibodies such as cetuximab and panitumumab, anti-VEGFR antibodies such as bevacizumab, anti-VEGFR2 antibodies such as ramucirumab, aflibercept, zivaflibercept, regorafenib, combination of trametinib and palbociclib, Reolysin®, combination of dabrafenib, trametiniv and panitumumab, and combinations thereof.

When it is determined that the pks island, in particular the *E. coli* positive for pks island, is absent in a biological sample, in particular a feces or colonic biopsy sample, from a subject, an anti-PD-1 and/or anti-PDL1 therapy may be administered in combination with an additional anti-cancer therapy.

In a certain embodiment, the additional anti-cancer therapy is selected from the group consisting of immune checkpoint inhibitors, radiation therapy (e.g., hypofractionated radiation therapy, stereotactic body radiation therapy), surgery, small molecule kinase inhibitors (e.g., sorafenib, ceritinib), chemotherapeutic agents (e.g., paclitaxel, pemetrexed, gemcitabine) including platinum-based chemotherapeutic agents (e.g, carboplatin, cisplatin), nucleic acid synthesis inhibitors (e.g., decitabine), cancer vaccines (e.g., ISA101b), anti-CD38 antibodies (e.g., isatuximab), anti-MUC16×CD3 bispecific antibodies (e.g., REGN4018), anti-CD20×CD3 bispecific antibodies (e.g., REGN1979), granulocyte-macrophage colony-stimulating factor (GM-CSF), anti-TGFβ antibodies (e.g., SAR439459), an indoleamine-2,3-dioxygenase (IDO) inhibitor, an IL-6R inhibitor, an IL-4R inhibitor, an IL-10 inhibitor, a cytokine such as IL-2, IL-7, IL-21, and IL-15, an anti-inflammatory drug such as corticosteroids, non-steroidal anti-inflammatory drugs, and combinations thereof.

In a particular embodiment, the immune checkpoint inhibitor is an anti-CTLA4 antibody (e.g., ipilimumab, REGN4659) or an anti-LAG-3 antibody (e.g., REGN3767).

The present invention also concerns an anti-PD1 and/or anti-PDL1 antibody, as defined above, for use in a method for treating a subject suffering from cancer, said method comprising:
  a) determining, from a biological sample from the subject, in particular a feces or colonic biopsy sample from the subject, the presence of a pks island as defined above,
  b) when it is determined in step a) that said pks island is absent, administering to said subject a therapeutically effective amount of an anti-PD1 and/or anti-PDL1 antibody as defined above.

Another object of the invention concerns the use of an anti-PD1 and/or anti-PDL1 antibody as defined above in the manufacture of a medicament intended for a method for treating a subject suffering from cancer, said method comprising:
  a) determining, from a biological sample from the subject, in particular a feces or colonic biopsy sample from the subject, the presence of a pks island as defined above,
  b) when it is determined in step a) that said pks island is absent, administering to said subject a therapeutically effective amount of an anti-PD1 and/or anti-PDL1 antibody as defined above.

The present invention further concerns a method for treating a subject suffering from cancer, said method comprising the steps of:
  a) determining, from a biological sample from the subject, in particular a feces or colonic biopsy sample from the subject, the presence of a pks island as defined above,
  b) when it is determined in step a) that said pks island is present, administering to said subject a therapeutically effective amount of an anti-cancer therapy which is not an anti-PD-1 therapy as defined above; or
  when it is determined in step a) that said pks island is absent, administering to said subject a therapeutically effective amount of an anti-PD-1 therapy as defined above.

Unless otherwise indicated, "treating" or "treatment" of a disease, disorder, or syndrome, as used herein, means inhibiting the disease, disorder, or syndrome, that is, arresting its development; and relieving the disease, disorder, or syndrome, that is, causing regression of the disease, disorder, or syndrome. As is known in the art, in the context of treatment, adjustments for systemic versus localized delivery, age, body weight, general health, sex, diet, time of administration, drug interaction and the severity of the condition may be necessary, and will be ascertainable with routine experimentation by one of ordinary skill in the art.

The terms "administer" or "administration" refers to the act of injecting or otherwise physically delivering a substance as it exists outside the body (e.g., a formulation of the invention) into a patient, such as by mucosal, intradermal, intravenous, subcutaneous, intramuscular delivery and/or any other method of physical delivery described herein or known in the art. When a disease, or a symptom thereof, is being treated, administration of the substance typically occurs after the onset of the disease or symptoms thereof. When a disease or its symptoms are being prevented, administration of the substance typically occurs before the onset of the disease or symptoms thereof.

The terms "effective amount" or "pharmaceutically effective amount" or "therapeutically effective amount" refer to a sufficient amount of an agent to provide the desired biological, therapeutic, and/or prophylactic result. That result can be reduction, amelioration, palliation, lessening, delaying, and/or alleviation of one or more of the signs, symptoms, or causes of a disease, or any other desired alteration of a biological system. In reference to cancer, an effective amount comprises an amount sufficient to cause a tumor to shrink and/or to decrease the growth rate of the tumor (such as to suppress tumor growth) or to prevent or delay other unwanted cell proliferation. In some embodiments, an effective amount is an amount sufficient to delay development. In some embodiments, an effective amount is an amount sufficient to prevent or delay recurrence.

An effective amount can be administered in one or more administrations. The effective amount of the therapy may: (i) reduce the number of cancer cells; (ii) reduce tumor size; (iii) inhibit, retard, slow to some extent, and preferably stop cancer cell infiltration into peripheral organs; (iv) inhibit (i.e., slow to some extent and preferably stop) tumor metastasis; (v) inhibit tumor growth; (vi) prevent or delay occurrence and/or recurrence of tumor; and/or (vii) relieve to some extent one or more of the symptoms associated with the cancer.

The amount can vary depending on such factors as the size and weight of the subject, the type of illness, or the particular compound of the therapy. The amount also can vary depending on the compound, the disease state and its severity, the age of the patient to be treated, and the like. The effective amount can be determined by one of ordinary skill in the art having regard to their knowledge and to this disclosure.

The terms "comprising" and "including" are used herein in their open-ended and non-limiting sense unless otherwise noted.

The terms "a" and "an" and "the" and similar references in the context of describing the invention (especially in the context of the following claims) are to be construed to cover both the singular and the plural, unless otherwise indicated herein or clearly contradicted by context.

Description of the sequences

| SEQ ID NO | Description | Sequence |
|---|---|---|
| 1 | ClbN forward primer | GTTTTGCTCGCCAGATAGTCATTC |
| 2 | ClbN reverse primer | CAGTTCGGGTATGTGTGGAAGG |
| 3 | RPM1-14 light chain, without SP chimeric mouse Variable rat Constant Kappa | DIVMTQGTLPNPVPSGESVSITCRSSKSLLYSDGKTYLN WYLQRPGQSPQLLIYWMSTRASGVSDRFSGSGSGTDFTL KISGVEAEDVGIYYCQQGLEFPTFGGGTKLELKRADAAP TVSIFPPSSEQLTSGGASVVCFLNNFYPKDINVKWKIDG SERQNGVLNSWTDQDSKDSTYSMSSTLTLTKDEYERHNS YTCEATHKTSTSPIVKSFNRNEC |

Description of the sequences

| SEQ ID NO: | Description | Sequence |
|---|---|---|
| 4 | RMP1-14 heavy chain without SP mouse variable, mouse constant IgG1 | EVQLQESGPGLVKPSQSLSLTCSVTGYSITSSYRWNWIR KFPGNRLEWMGYINSAGISNYNPSLKRRISITRDTSKNQ FFLQVNSVTTEDAATYYCARSDNMGTTPFTYWGQGTLVT VSSAKTTPPSVYPLAPGSAAQTNSMVTLGCLVKGYFPEP VTVTVVNSGSLSSGVHTFPAVLQSDLYTLSSSVTVPSST WPSETVTCNVAHPASSTKVDKKIVPRDCGCKPCICTVPE VSSVFIFPPKPKDVLTITLTPKVTCVVVDISKDDPEVQF SWFVDDVEVHTAQTQPREEQFNSTFRSVSELPIMHQDWL NGKEFKCRVNSAAFPAPIEKTISKTKGRPKAPQVYTIPP PKEQMAKDKVSLTCMITDFFPEDITVEWQWNGQPAENYK NTQPIMDTDGSYFVYSKLNVQKSNWEAGNTFTCSVLHEG LHNHHTEKSLSHSPG |

The present invention will be further illustrated by the examples below.

EXAMPLE

Colorectal cancer (CRC) is the third most common malignancy and is the fourth leading cause of cancer-related deaths in men and the third leading cause among women worldwide. Host factors associated with environmental and nutritional factors play an important role in the colorectal carcinogenesis. In the recent two decades, growing attention has been given to the role of intestinal microbiota dysbiosis in CRC-carcinogenesis. Studies showed a reduction of tumorigenesis in the intestines of animals raised in a germ-free environment, in both genetically induced or colitis-associated CRC mouse models. Moreover, colorectal cancer patients often exhibit a distinct microbiota compared to healthy population (Nakatsu et al. (2015) *Nat. Commun.* 6:8727). Mechanisms by which intestinal microbiota dysbiosis has been shown to promote colorectal carcinogenesis are not yet elucidated. Association of exposure to antibiotics in early life with colorectal adenoma risk development at the age of 60, suggests the impact of microbiota dysbiosis at the first steps of the carcinogenesis. Recently Wong et al. showed that gavage with feces from colorectal cancer patients promote intestinal carcinogenesis in germ-free and azoxymethane-(AOM)-carcinogen mice models (Wong et al. (2017) *Gastroenterology* 153:1621-1633). Despite the large number of studies, CRC associated dysbiosis is partly defined. However, some bacterial strains, such as *Bacteroides fragilis*, *Fusobacterium nucleatum* and *Escherichia coli*, have a well-established role in CRC development.

Even if *E. coli* is a commensal bacterium, several strains have acquired some virulence factors including genotoxins, such as colibactin. The colibactin toxin, a hybride polyketide non-ribosomal peptide is encoded by the polyketide synthase (pks) pathogenicity island (Johnson et al. (2008) *J. Clin. Microbiol.* 46:3906-3911). This colibactin-pks-island was preferentially detected in CRC samples in comparison to non-neoplasic control (Nakatsu et at (2015) *Nat. Commun.* 6:8727; Arthur et al. (2012) *Science* 338:120-123; Buc et al. (2013) *PLoS ONE* 8:e56964; Prorok-Hamon et al. (2014) *Gut* 63:761-770; Eklöf et al. (2017) *Int. J. Cancer* 141:2528-2536). Genes for colibactin (clbB gene of the pks-island) were highly enriched in familial adenomatous polyposis (FAP) patients' colonic mucosa compared to healthy individuals. In the same way, Nakatsu et al. detected pks-positive bacteria in adenoma suggesting the presence of these bacteria during early stages of carcinogenesis (Nakatsu et at (2015) *Nat. Commun.* 6:8727).

Using a well characterized subcutaneous syngenic mouse model the inventors evaluated the impact of the chronic infection on anti-tumoral response mediated by anti-PD-1 immunotherapy. In parallel, they evaluated the T-cell populations in a collection of human CRC samples previously characterized for their pks island status

Materials and Methods

Bacteria Strains

The representative CRC-colibactin-producing *E. coli* strain named 11G5 was isolated from the colonic tissue of a patient with colon cancer and was resistant to ampicillin and kanamycin (Buc et al. (2013) *PLoS ONE* 8:e56964).

Animals

All studies were approved by local ethical committee (No. CE-2912) and the French Ethical Animal Use Committee (Apafis #5401 and Apafis #13812). Studies were performed using 6- to 7-week-old wild-type (WT) C57BL/6J mice (Charles River Laboratories, L'Abresle, France). All mice were housed in conventional conditions at the animal care facility of Université Clermont Auvergne (Clermont-Ferrand, France).

11G5 Impact on Anti-PD-1 mAb Efficacy in Mice

Transplantable MC38 CRC cells derived from C57BL/6J mice were maintained as monolayers using culture medium consisting of DMEM (Invitrogen, Cergy Pontoise, France) supplemented with 10% FCS (Biowest, Nuaillé, France), 1% glutamin, 1% hepes, 1 mM non-essential amino acids, 1 mM sodium pyruvate at 37° C. in a humidified incubator containing 5% $CO_2$. Experiments were performed in 6- to 8-week old WT C57BL/6J male mice with 8 animals per group. To enhance *E. coli* strain colonization, the inventors administrated streptomycin (2.5 g/L) for 3 days before oral inoculation of bacteria ($\approx 1 \times 10^9$ bacteria) or PBS alone (non-infected controls). Nine days after infection, mice were anesthetized by isoflurane inhalation and were inoculated with $1 \times 10^6$ MC38 cells by dorsal subcutaneous injection at day 0 of the experiment. At 8, 11, 14, 18, 20 and 22 days after tumor cell injection, non-infected or 11G5-infected mice were injected intraperitoneality (i.p) with the PD-1 specific blocking antibody (mu anti-PD-1; mIgG1—a chimeric version of the RPM1-14 rat monoclonal antibody with a mouse IgG1 Fc domain) or an IgG1 isotype control antibody (mIgG1, clone 113711) (10 µg/g of mice). The RPM1-14 rat monoclonal antibody is described in Natalia Martin-Orozco et al. (J Immunol Dec. 15, 2006, 177 (12)

8291-8295). The chimeric version of the RPM1-14 rat monoclonal antibody with a mouse IgG1 Fc domain has a light chain of SEQ ID NO: 3 and a heavy chain of SEQ ID NO: 4. To evaluate potential toxicity, body weight was measured twice a week. To monitor tumoral growth, tumor volume in mm$^3$ was calculated twice a week from the measurement of two perpendicular diameters using a caliper according to the formula L×S$^2$/2 where L and S are the largest and smallest diameters in mm respectively. The mice were sacrificed at day 30 of the experiment. Tumors were removed and weighted.

Chronic Infection Animal Model

Bacterial infection of C57BL/6J-Apc$^{Min/+}$ female was performed as described in Bonnet et al. (2014) Clin Cancer Res 20:859-867. To enhance E. coli strain colonization, streptomycin (2.5 g/L) was administered for 3 days prior to oral inoculation with bacteria ($\approx$1×10$^8$ bacteria in PBS) or PBS alone (non-infected controls). Three E. coli strains were tested: the pks-positive 11G5 strain, its isogenic mutant 11G5ΔClbQ and the K-12 MG1655 commensal strain. Faecal bacterial colonization was periodically quantified as colony-forming unit per stool as described in Bonnet et al. (2014) Clin Cancer. Res. 20:859-867. Fifty days after inoculation, the mice were sacrificed. The colons were removed from the caecum to the rectum. Then, the polyps were counted. Tissues were prepared for bacterial colonization and immunostaining experiments. Mesenteric lymph nodes (MLNs) were harvested and homogenized then bacterial colonization was evaluated by selective culture and immune cell were analysed by flow cytometry. According to the parameters studied, at least 6 animals per group were tested and the experiments were reproduced at least twice.

Immunofluorescent Staining and Quantitation of Immune Cells

At the end of the experiment the colons were swiss-rolled from the distal to proximal end and fixed for 24 h in 10% formalin (Sigma, Tokyo, Japan) at room temperature. Blocks were embedded in paraffin and cut into 5 µm sections, then the tissue sections were prepared for hematoxylin-eosin-safranin staining or immunofluorescence stainings to analyse colonic immune cells in tumor. Immunostainings were performed in four serial sections to target some immune cell populations: CD4 T cell (CD3$^+$CD4$^+$); CD8 T cells (CD3$^+$CD8$^+$). All IF stainings were performed using an automated stainer, Discovery XT processors (Roche, Bale, Swiss), and the tyramide signal amplification (TSA)-conjugated fluorochrome method was used on whole colon slides. Cells quantification was made on the whole colonic mucosa by a specific digital image analysis process.

Immune Contexture Determination on Human CRC Biopsies

Immune contexture (CD3 and CD8 densities) were determined on 40 CRC samples from the MiPaCor collection samples (DC-2017-2972). All the samples were previously tested for pks status on colonic tissues by PCR (Gagnière et al. (2017) Clin. Sci. 131:471-485), using as forward primer, the primer of sequence SEQ ID NO: 1 and as reverse primer, the primer of sequence SEQ ID NO: 2. The inventors selected 20 pks-negative and 20 pks-positive samples. After colonic resection, fresh specimens were collected, fixed in buffered 4% paraformaldehyde, embedded in paraffin, cut into 5 µm slices. Two tissue paraffin sections of 4 µm were processed for immunohistochemistry. Digital images of the stained tissue sections were obtained at 20× magnification and 0.45 µm/pixel resolution. The densities of CD3$^+$ and CD8$^+$ T cells in colon tumor and invasive margin regions were determined.

Analysis of MC38 Tumor Infiltrating Immune Cells by Flow Cytometry

Single-cell suspensions from MC38 tumors were prepared by using Mouse Tumor Dissociation kit and gentleMACS Dissociator (Miltenyi-Biotec) according to the manufacturer's instructions. All antibodies used in this study are described in Table 1 below. The cell suspensions were washed in PBS and stained with fixable Viability Dye eFluor450 (eBioscience) according to the manufacturer's instructions. The cells were then washed and incubated at 4° C. with anti-CD16/CD32 before the surface staining of the CD45, CD3, CD4, CD8, CD11 b, GR-1+, Ly6G+, and Ly6C+ immune receptors. Data were acquired on a BD LSR II flow cytometer (Becton-Dickinson), and analysis was performed using FlowJo™ (TreeStar) and BD FACS-DIVA™ software (BD Biosciences).

TABLE 1

Antibodies used in immunofluorescence for staining of whole colon sections (IHC-IF) or flow cytometry (FC).

| Used for | Target | Species | Clone | Manufacturer | Fluoro-chrome/coupled Protein |
|---|---|---|---|---|---|
| IHC-IF | CD45 | Rabbit | NA | Abcam | NA |
| | Ly6G | Rat | 1A8 | Biolegend | NA |
| | CD3 | Rabbit | SP7 | ThermoFisher | NA |
| | CD4 | Rat | 4SM95 | ThermoFisher | NA |
| | CD8 | Rat | 4SM15 | ThermoFisher | NA |
| | Rat IgG | Goat | NA | Jackson | NA |
| | Rabbit IgG | NS | NS | Roche | HRP |
| | Rat IgG | NS | NS | Roche | HRP |
| | Goat IgG | NS | NS | Roche | HRP |
| FC | CD45.2 | Mouse | 104 | ThermoFisher | PE-efluor610 |
| | TCR-β | Armenian | H57-597 | ThermoFisher | APC-eFluor780 |
| | CD3 | Rat | 17A2 | ThermoFisher | APC-eFluor780 |
| | CD4 | Rat | RM4-5 | ThermoFisher | APC |
| | CD8 | Rat | 53-6.7 | ThermoFisher | PerCP-eFluor 710 |
| | CD25 | Rat | 3C7 | ThermoFisher | A488 |
| | FoxP3 | Rat | FJK-16s | ThermoFisher | PE |
| | CD11b | Rat | M 1/70 | ThermoFisher | A700 |
| | GR-1 | Rat | RB6-8C5 | ThermoFisher | A488 |
| | Ly6G | Rat | 1A8 | ThermoFisher | PerCPefluor 710 |
| | Ly6C CD16/CD32 | Rat | 93 | ThermoFisher | NA |

APC: Allophycocyanin, HRP: Horseradish Peroxidase, NA: Not Applicable, NS: Not Specified, PE: Phycoerythrin, Per-CP: Peridinin-chlorophyll proteins.

Statistical Analyses

One-way ANOVA followed by Tukey's post-test or unpaired Student t test were used for statistical analyses. Correlations were determined by Spearman test. All tests were performed using Graph Pad Prism 7 (StataCorp, College Station, TX, USA).

p-values≤0.05 were considered statistically significant.

Results

Figure 2:
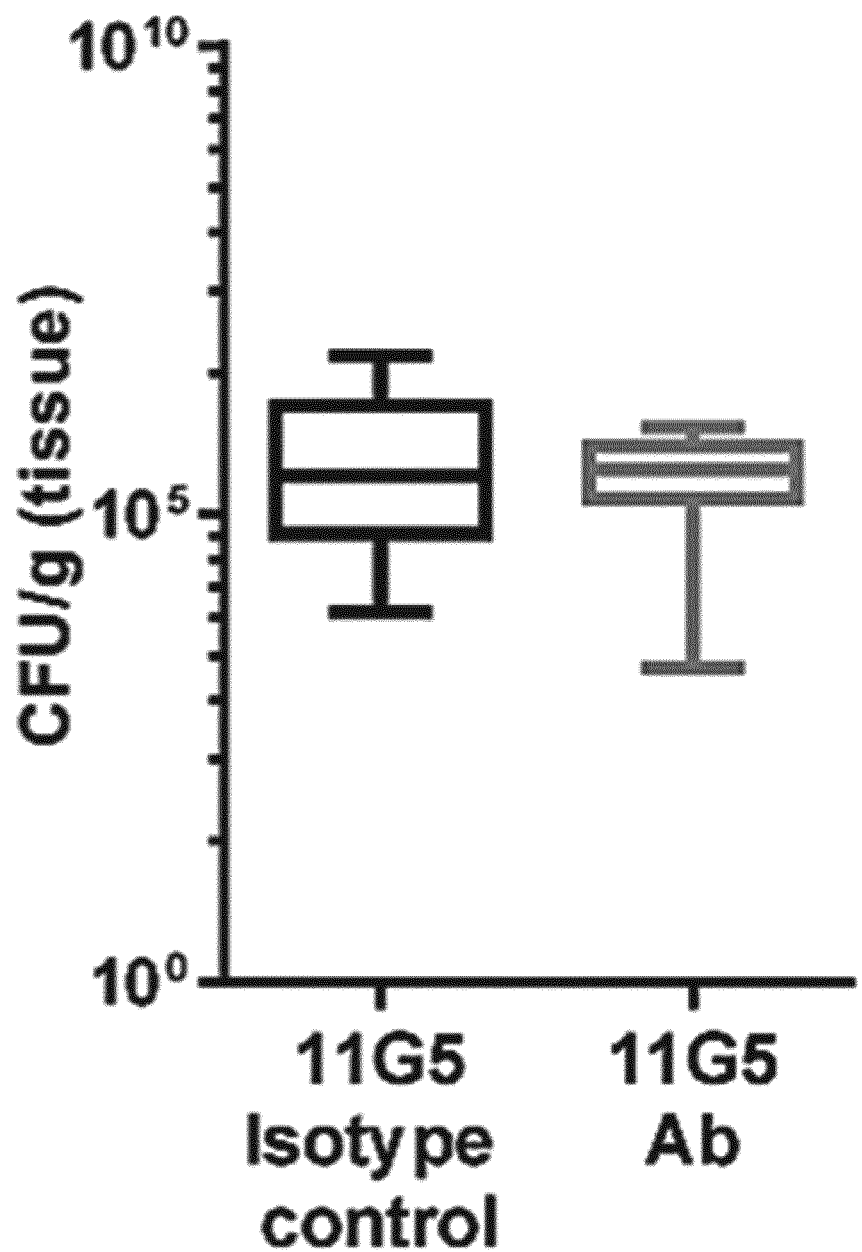
Figure 3:
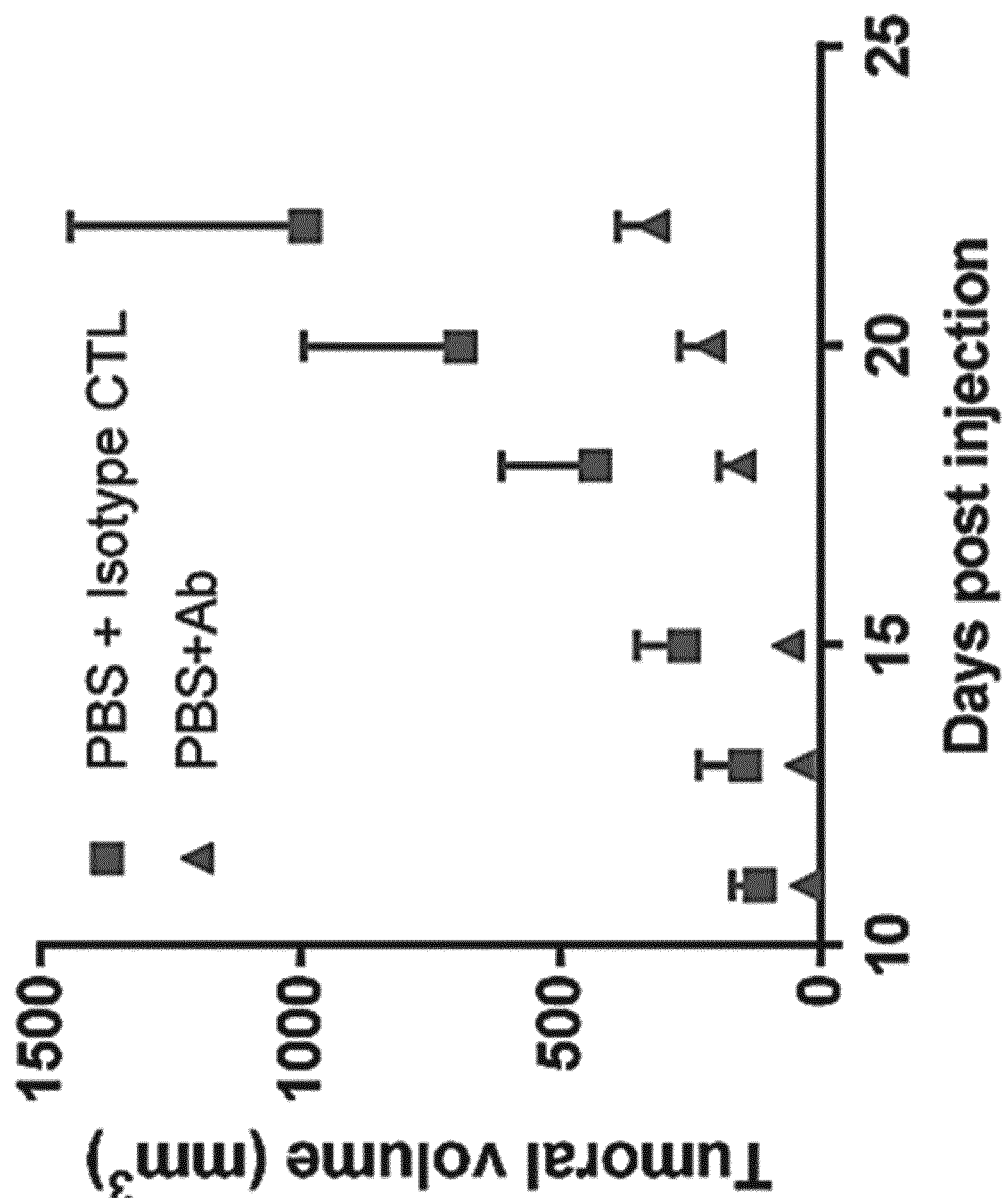
Figure 4:
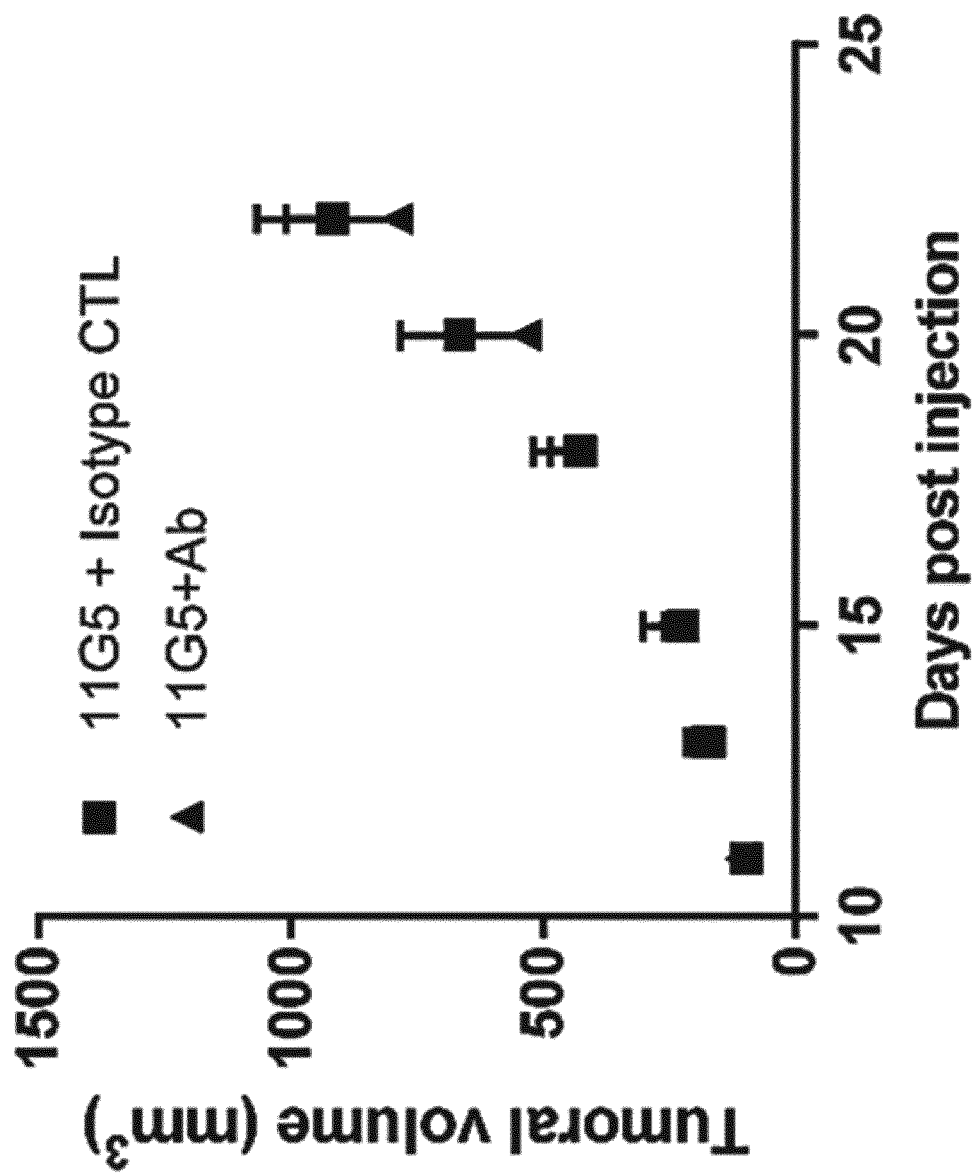

Infection with the Colon Cancer-Associated E. coli 11G5 Strain Induces a Resistance to the Anti-PD-1 Immunotherapy The inventors investigated the impact of a chronic infection of the gut with 11G5 strains on the anti-PD-1 therapy efficacy. For this purpose, they chose the MC38 murine tumors grafts on C57Bl6 mice as animal model. Animals were firstly orally infected with the 11G5 strain and 9 days post-infection MC38 cells were subcutaneously inoculated. Then MC38 tumors-bearing mice were injected with anti-PD-1 treatment or the isotype antibody control at 8, 11, 14, 18, 20 and 22 days after MC38-cells inoculation. FIGS. 1 and 2 showed that anti-PD-1 treatment did not impact the bacterial colonization of the gut. In FIG. 3 the inventors observed a significant response of MC38 tumors to anti-PD-1 treatment. Indeed, tumoral growth was significantly slowed, demonstrating the anti-tumoral efficacy of the anti-PD-1 treatment in the experimental conditions. In contrast, no anti-tumoral effect was observed in animals infected with the 11G5 strain and subjected to the same treatment (FIG. 4).

Infection with the Colibactin-Producing *E. coli* 11G5 Strain Induces a Decrease of Intra-Tumoral $CD3^+$ and $CD3^+CD8^+$ T Cells.

The effect of colibactin-producing *E. coli* chronic infection on MC38 murine graft model was investigated using flow cytometry.

Figure 7:
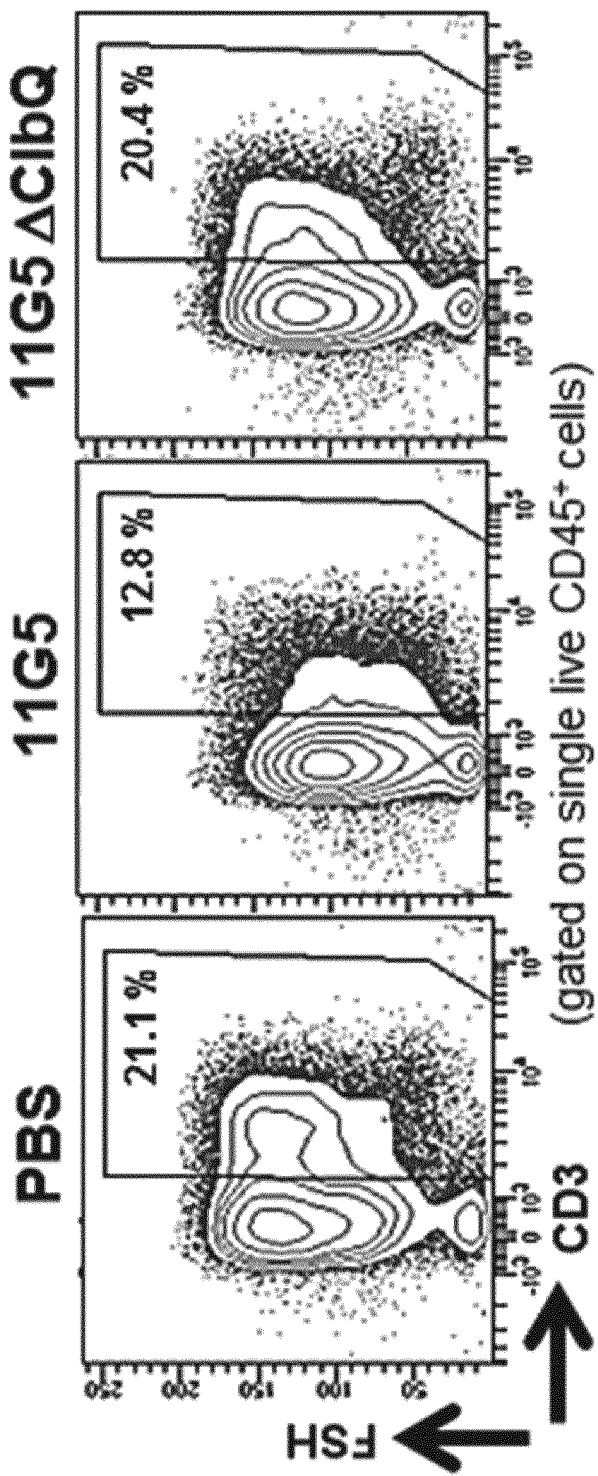
FIG. 7-12. Effect of pks+*E. coli* preinfection on TILs level in mice grafted with MC38 tumors.
Figure 8:
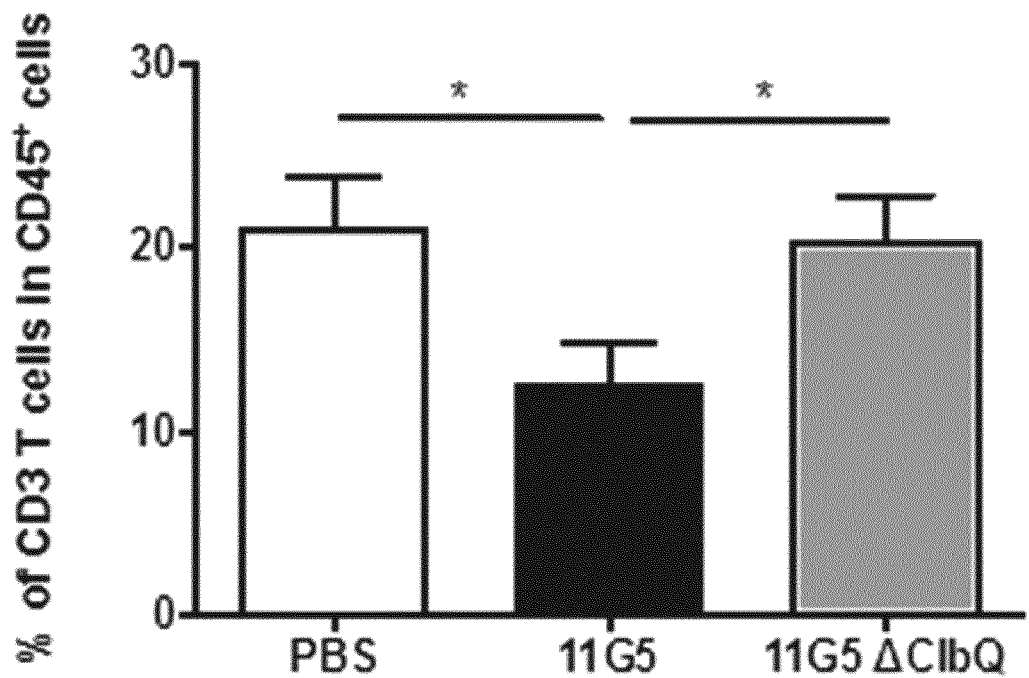
Figure 9:
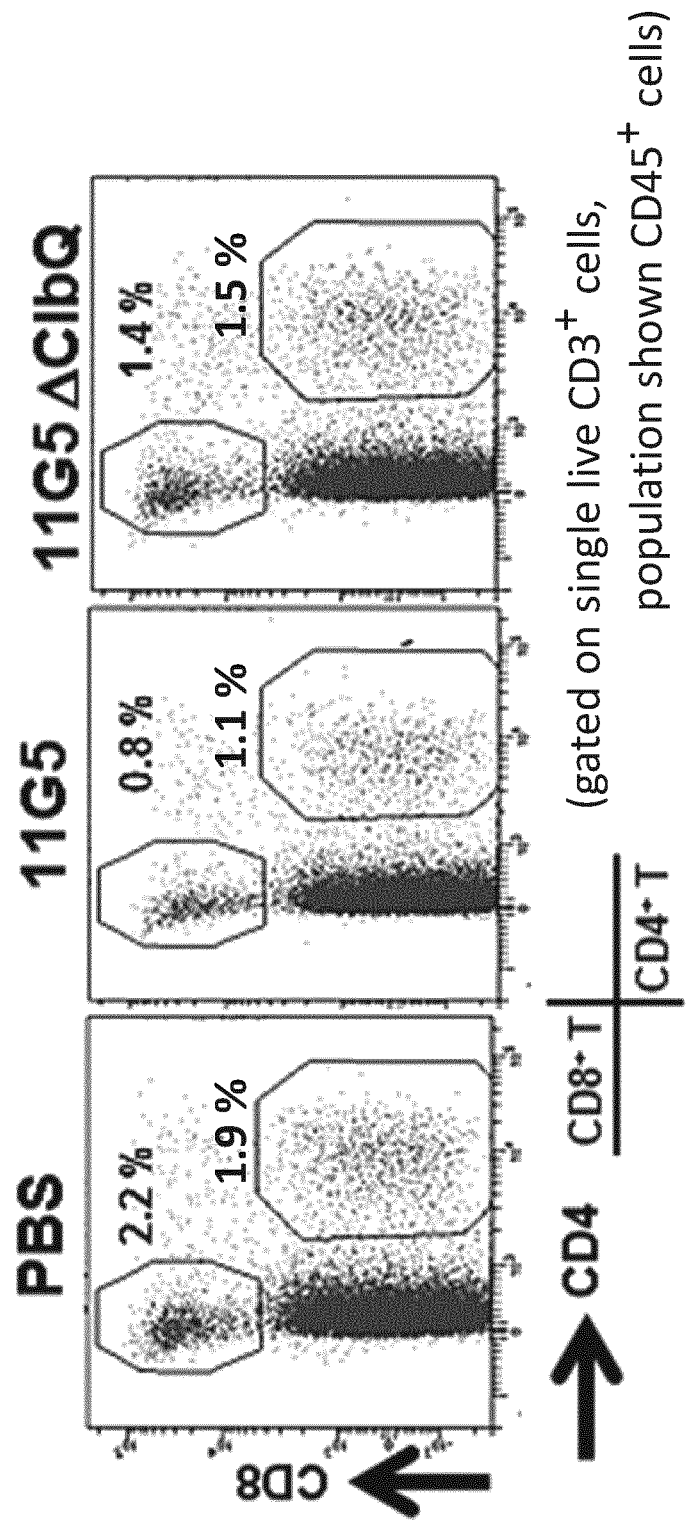
Figure 10:
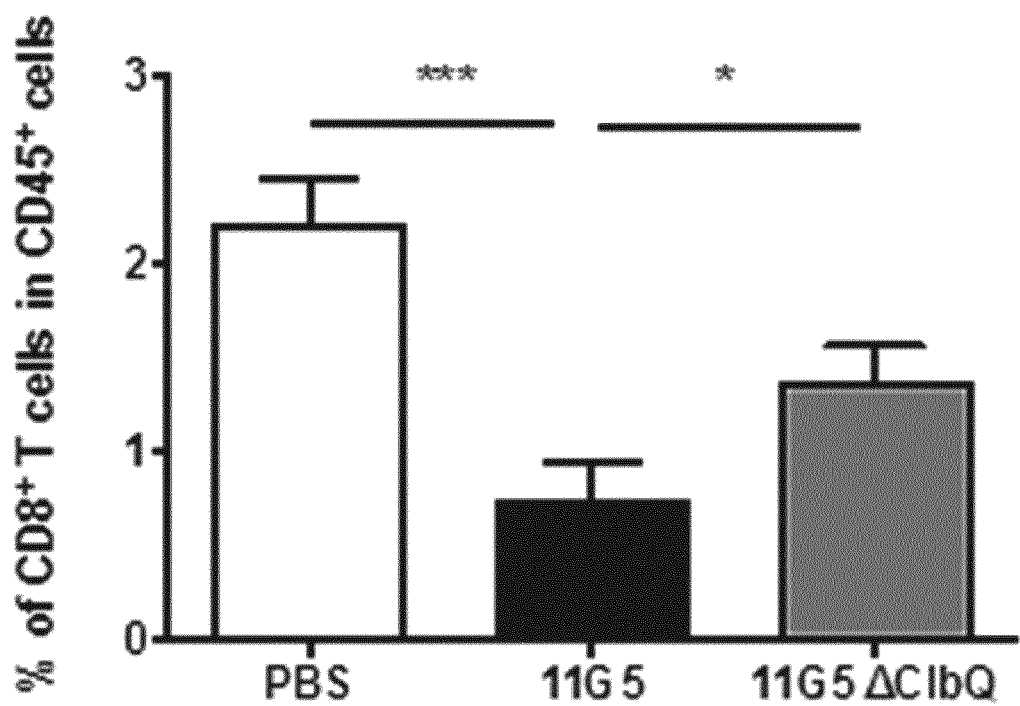
Figure 11:
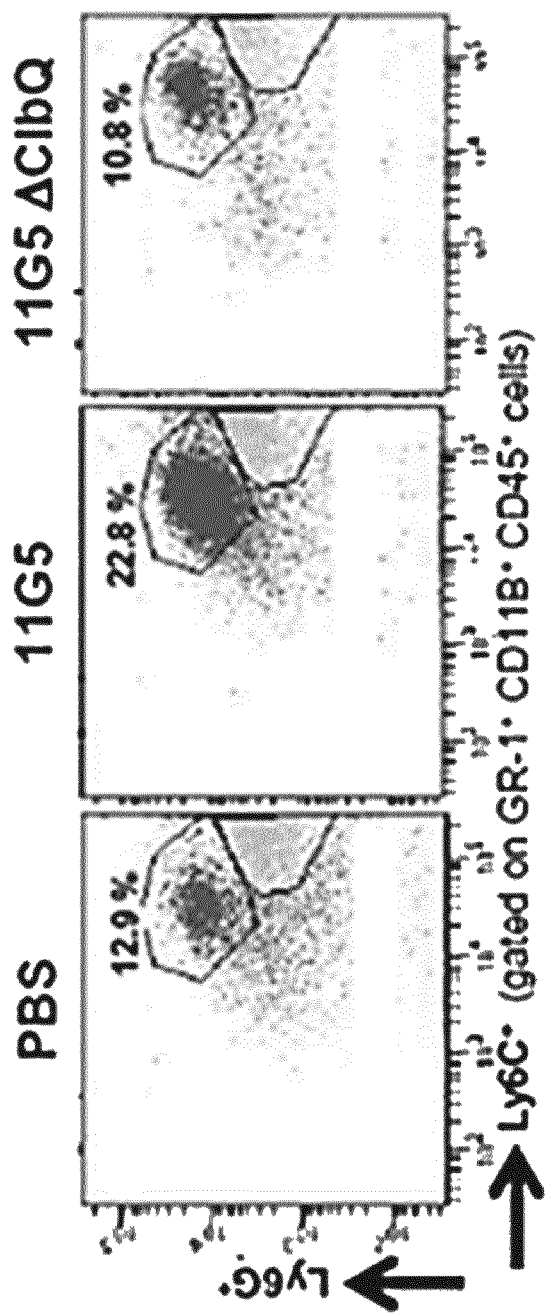
Figure 12:
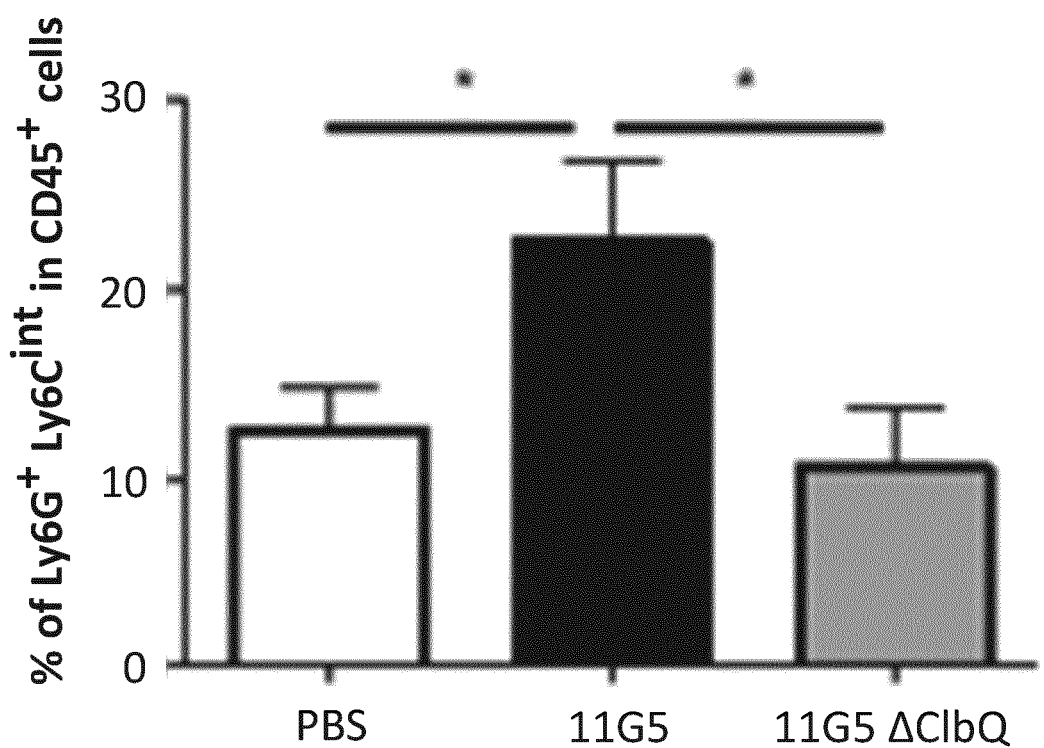

A significant decrease in $CD3^+$ tumor infiltrating-lymphocytes (TILs) was observed in MC38 tumors of 11G5 infected animals in comparison to control animals (FIGS. 7 and 8). A global decrease of $CD8^+$ TILs was observed only in 11G5-infected mice group (FIGS. 9 and 10). No effect was noticed for the $CD4^+$ TILs (data not shown). Finally, a significant increase of neutrophils population was measured in 11G5-infected samples (FIGS. 11 and 12).

The Colon Cancer-Associated *E. coli* 11 G 5 Strain Induces a Decrease of $CD3^+$ Cells Population in Min Mice Colon Tumors.

Figure 6:
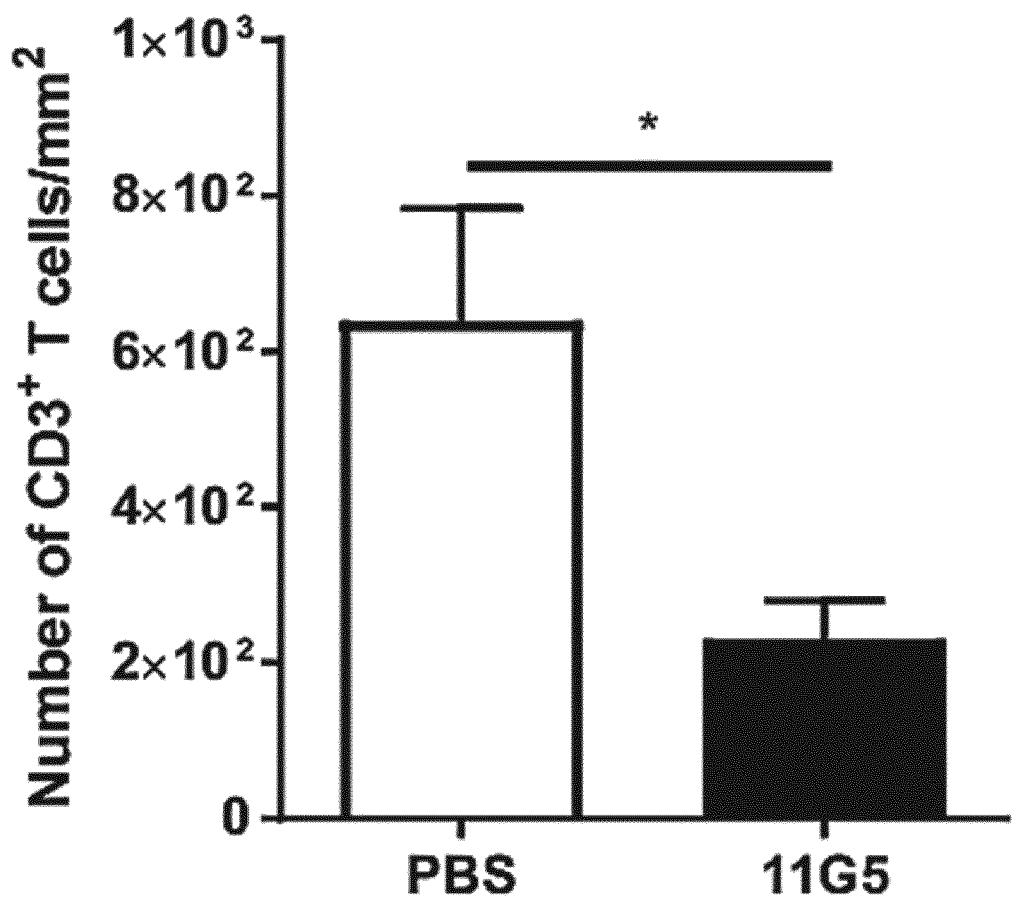
FIG. 6: The colon cancer-associated *E. coli* 11G5 strain modulates T cell density in the colon of APC$^{Min/+}$ mice. Immunofluorescence staining for CD3 was performed on colon section at 50 days post infection. Cells density were obtained by digital image analysis of each stained section. The figure shows the density of TILs for each group of mice (non-infected: PBS, and 11G5ΔClbQ-infected: 11G5). *p=0.05.

T cell populations were investigated by analyzing the total T cells population by CD3 staining at 50 days p.i., on colonic sections of tumors from infected and control Min mice (non-infected and 11G5ΔClbQ-infected). Representative CD3 staining of tumors was obtained. A significant decrease of $CD3^+$ cells was observed in the tumors (FIG. 6). It was observed that intra-tumoral repartition of $CD3^+$ cells was heterogeneous and the decrease was particularly observed in the margin of the polyps.

Pks-Positive-*E. coli* Colonization is Associated with a Decrease of Tumor Infiltrating-Lymphocytes T Cells (TILs) at the Invasive Margin of Human CRC Samples.

In order to make a link with colorectal carcinoma in human and see if the presence of T cells as Tumor infiltrating lymphocytes or in the tumor invasive margin could be correlated with the presence of pks-positive *E. coli*, CD3 and CD8 stainings were performed on 40 CRC tumors samples at the immunomonitoring Platform of the Hôpital Européen Georges Pompidou (Paris).

Figure 5:
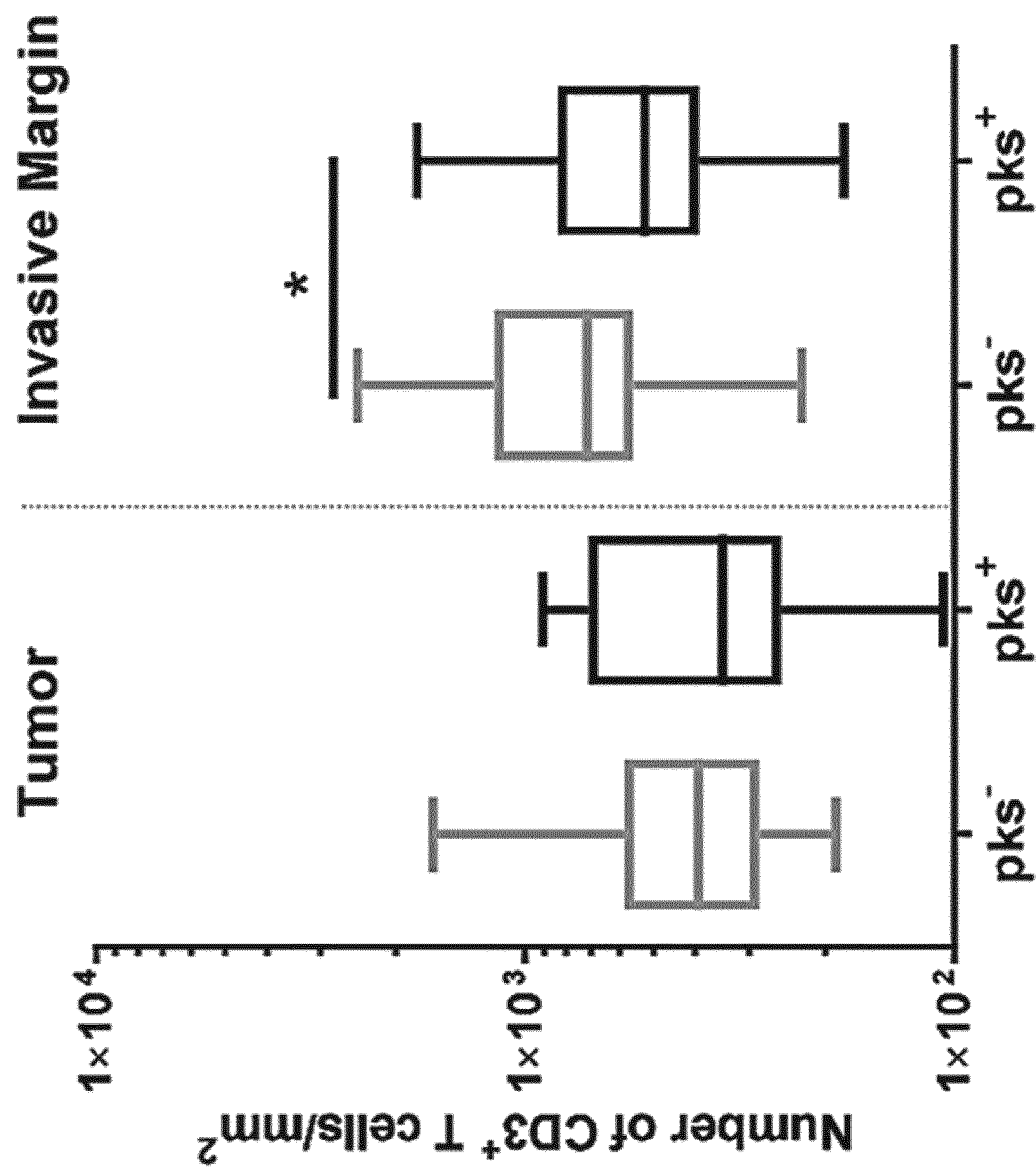
FIG. 5: Densities of TILs in tumor and at the invasive margin of patients colonized by pks$^+$ or pks$^-$ *E. coli*, were assessed by digital image analysis. *p=0.05.

The densities of $CD3^+$ and $CD8^+$ T cells in colon tumor and invasive margin regions were determined and correlated with the *E. coli* colonization and the presence of pks-positive bacteria. No significant correlation was observed between colonization of the tissue by *E. coli* and $CD3^+$ or $CD8^+$ cell populations (data not shown). FIG. 5 showed a significant decrease of $CD3^+$ cells in pks-positive tumors only in the invasive margin.

Discussion

In the course of studying immune micro environment, we focused our work on the T-cell populations in the colon of $Apc^{Min/+}$ mice as this population was shown in humans to be of importance for cancer prognosis. It appeared that presence of *E. coli* positive for pks island in these mice microbiota decreased the number of T cells in the various immune regions that we looked at.

The inventors hypothesized that the presence of pks+*E. coli* could affect the efficacy of anti-tumoral treatments in particular aimed at T cell activation such as checkpoint inhibitors. To monitor easily the tumoral growth, the inventors chose to test the anti-PD1 immunotherapy on the MC38-subcutaneaous graft in mice infected orally by pks+ *E. coli*. Experimental therapeutic response of this model was shown to be sensitive to the microbiota environment. Moreover it was used in different studies to evaluate the impact of several micro-organisms on the efficacy of anti-PD-1 antibodies (Gopalakrishnan et al. (2018) *Science* 359:97-103; Sivan et al. (2015) *Science* 350:1084-1089). With this model, the inventors showed that pks+ *E. coli* infection induces a resistance of the MC38 tumors to anti-PD-1 immunotherapy.

The inventors further showed a significant decrease of $CD3^+$ cells in human tumors colonized by some pks-positive *E. coli* suggesting a relation between the presence of this bacteria and CRC prognostic.

This study shows that *E. coli* bacteria positive for pks island, can be a new biomarker to predict anti-PD-1 response in CRC patients.

The invention claimed is:

1. A method for treating a subject suffering from colorectal cancer, said method comprising
   i) determining the presence or absence of an *E. coli* pks island in a feces or colonic biopsy sample from said subject; and
   ii) administering to said subject a therapeutically effective amount of an anti-cancer therapy,
   wherein:
      the anti-cancer therapy administered to said subject is not an anti-PD1 therapy when a pks island has been determined to be present in feces or a colonic biopsy sample from said subject, or
      the anti-cancer therapy administered to said subject is an anti-PD1 antibody and/or anti-PDL1 antibody when a pks island has been determined to be absent in feces or a colonic biopsy sample from said subject.

2. The method according to claim 1, wherein said anti-PD1 antibody is cemiplimab.

3. The method according to claim 1, wherein said anti-PD1 antibody and/or anti-PDL1 antibody is used in combination with an additional anti-cancer therapy.

4. The method according to claim 3, wherein the additional anti-cancer therapy is selected from the group consisting of an immune checkpoint inhibitor, radiation therapy, surgery, a small molecule kinase inhibitor, a chemotherapeutic agents, a nucleic acid synthesis inhibitor, a cancer vaccine, an anti-CD38 antibody, an anti-MUC16×CD3 bispecific antibody, an anti-CD20×CD3 bispecific antibody, a granulocyte-macrophage colony-stimulating factor (GM-CSF), an anti-TGFβ antibody, an indoleamine-2,3-dioxygenase (IDO) inhibitor, an IL-6R inhibitor, an IL-4R inhibitor, an IL-10 inhibitor, a cytokine, an anti-inflammatory drug, a corticosteroids, a non-steroidal anti-inflammatory drug, and combinations thereof.

5. The method according to claim 1, wherein said anti-cancer therapy which is not an anti-PD1 therapy is selected from the group consisting of irinotecan, oxaliplatin, combination of irinotecan with 5-FU and leucovorin, combination of oxaliplatin with 5-FU and leucovorin, combination of irinotecan with capecitabine, combination of oxaliplatin and capecitabine, anti-EGFR antibodies, anti-VEGFR antibodies, and anti-VEGFR2 antibodies.

6. The method according to claim 5, wherein said anti-EGFR antibodies are selected from the group consisting of cetuximab and panitumumab.

7. The method according to claim 5, wherein said anti-VEGFR antibody is bevacizumab.

8. The method according to claim 5, wherein said anti-VEGFR2 antibody is ramucirumab.

9. The method according to claim 1, wherein the presence of the pks island is determined by isolation of *Escherichia coli* bacteria on agar and determination of the presence of a pks island DNA.

10. The method according to claim 1, wherein the presence of the pks island is determined by determining the presence of an *Escherichia coli*-specific DNA and determining the presence of a pks island DNA.

11. The method according to claim 1, wherein the presence of a pks island is determined by determining the presence of a pks island DNA.

12. The method according to claim 11, wherein the presence of a pks island DNA is determined by PCR.

13. The method according to claim 12, wherein the PCR is performed using primers specific for a gene selected from the group consisting of the ClbH, ClbJ, ClbN, ClbC, ClbI, ClbOn ClbB and ClbK genes of the pks island.

* * * * *